(12) United States Patent
Moulckers et al.

(10) Patent No.: US 7,797,678 B2
(45) Date of Patent: Sep. 14, 2010

(54) AUTOMATIC GENERATION OF LICENSE PACKAGE FOR SOLUTION COMPONENTS

(75) Inventors: Ingrid M. Moulckers, Austin, TX (US); Amir Farrokh Sanjar, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 11/260,544

(22) Filed: Oct. 27, 2005

(65) Prior Publication Data

US 2006/0229994 A1    Oct. 12, 2006

Related U.S. Application Data

(63) Continuation-in-part of application No. 11/211,950, filed on Aug. 25, 2005, which is a continuation-in-part of application No. 11/127,846, filed on May 12, 2005, now abandoned, which is a continuation-in-part of application No. 11/109,038, filed on Apr. 19, 2005, now Pat. No. 7,526,759, and a continuation-in-part of application No. 11/109,069, filed on Apr. 19, 2005, which is a continuation of application No. 11/101,604, filed on Apr. 7, 2005, now Pat. No. 7,496,888.

(51) Int. Cl.
*G06F 9/44* (2006.01)

(52) U.S. Cl. ............... 717/121; 717/105; 717/106; 717/135; 717/177; 707/999.104; 707/999.107; 705/54; 705/59

(58) Field of Classification Search ............... 707/104; 705/59; 717/174, 177
See application file for complete search history.

(56) References Cited

U.S. PATENT DOCUMENTS 4,813,013 A    3/1989    Dunn (Continued)

FOREIGN PATENT DOCUMENTS

KR    2002068316    8/2002

OTHER PUBLICATIONS

<Author: Qian Zhaoet et al., Title: Policy Driven Licensing Model for Component Software, Date: 2003, Publisher: IEEE Computer Society,pp. 1-10.>.*

(Continued)

*Primary Examiner*—Tuan Q Dam
*Assistant Examiner*—Ziaul Chowdhury
(74) *Attorney, Agent, or Firm*—Robert H. Frantz; David A. Mims, Jr.

(57) ABSTRACT

A license package generator for use with a solution builder tool having behavioral model instances for system solution components, the instances being configured by behavioral and interface parameters by user inputs, the package generator accessing and obtaining a license code for each configured behavioral model instance for which a license is available in a data repository, creating or modifying an electronic license information package file to include list of license numbers associated with the license codes and notes selected regarding license serial number, a software package enabling code, a software package unlocking code, a granting source of a license, a component feature description, and an issue date of a license, and storing the electronic license package file stored in a computer memory.

21 Claims, 30 Drawing Sheets

U.S. PATENT DOCUMENTS

| | | | |
|---|---|---|---|
| 5,377,318 | A | 12/1994 | Wolber |
| 5,394,522 | A | 2/1995 | Sanchez-Frank et al. |
| 5,511,215 | A | 4/1996 | Terasaka et al. |
| 5,555,370 | A | 9/1996 | Li et al. |
| 5,572,648 | A | 11/1996 | Bibayan |
| 5,632,022 | A | 5/1997 | Warren et al. |
| 5,671,412 | A * | 9/1997 | Christiano ............... 707/104.1 |
| 5,758,068 | A * | 5/1998 | Brandt et al. .................. 726/27 |
| 5,848,393 | A | 12/1998 | Goodridge et al. |
| 5,913,055 | A | 6/1999 | Yoshida et al. |
| 5,913,065 | A | 6/1999 | Faustini |
| 6,023,766 | A * | 2/2000 | Yamamura ................... 726/29 |
| 6,073,124 | A * | 6/2000 | Krishnan et al. .............. 705/59 |
| 6,189,146 | B1 * | 2/2001 | Misra et al. ................. 717/177 |
| 6,208,345 | B1 | 3/2001 | Sheard et al. |
| 6,259,448 | B1 | 7/2001 | McNally et al. |
| 6,272,672 | B1 | 8/2001 | Conway |
| 6,279,154 | B1 | 8/2001 | Davis |
| 6,282,711 | B1 | 8/2001 | Halpern et al. |
| 6,334,213 | B1 | 12/2001 | Kojima et al. |
| 6,367,073 | B2 | 4/2002 | Elledge |
| 6,393,557 | B1 | 5/2002 | Guthridge et al. |
| 6,405,364 | B1 | 6/2002 | Bowman-Amuah |
| 6,427,132 | B1 | 7/2002 | Bowman-Amuah |
| 6,446,200 | B1 | 9/2002 | Ball et al. |
| 6,591,244 | B2 | 7/2003 | Jim et al. |
| 6,601,233 | B1 | 7/2003 | Underwood |
| 6,618,857 | B1 | 9/2003 | Zimniewicz et al. |
| 6,698,018 | B1 | 2/2004 | Zimniewicz et al. |
| 6,725,249 | B2 | 4/2004 | Sidi et al. |
| 6,738,964 | B1 | 5/2004 | Zink et al. |
| 6,742,175 | B1 * | 5/2004 | Brassard ..................... 717/107 |
| 6,744,450 | B1 | 6/2004 | Zimniewicz et al. |
| 6,748,583 | B2 | 6/2004 | Aizenbud-Reshef et al. |
| 6,785,805 | B1 | 8/2004 | House et al. |
| 6,816,842 | B1 * | 11/2004 | Singh et al. ................... 705/59 |
| 6,879,685 | B1 | 4/2005 | Peterson et al. |
| 6,882,723 | B1 | 4/2005 | Peterson et al. |
| 6,912,710 | B2 | 6/2005 | Broussard et al. |
| 6,937,705 | B1 | 8/2005 | Godfrey et al. |
| 6,937,993 | B1 | 8/2005 | Gabbita et al. |
| 6,966,039 | B1 | 11/2005 | Bartz et al. |
| 7,065,637 | B1 | 6/2006 | Nanja |
| 7,082,521 | B1 | 7/2006 | Nanja |
| 7,100,195 | B1 | 8/2006 | Underwood |
| 7,103,562 | B2 | 9/2006 | Kosiba et al. |
| 7,139,999 | B2 | 11/2006 | Bowman-Amuah |
| 7,228,541 | B2 | 6/2007 | Gupton et al. |
| 7,290,056 | B1 | 10/2007 | McLaughlin, Jr. |
| 7,313,534 | B2 | 12/2007 | Scheer |
| 7,356,482 | B2 | 4/2008 | Frankland et al. |
| 7,376,904 | B2 | 5/2008 | Cifra |
| 7,404,175 | B2 | 7/2008 | Lee et al. |
| 7,428,733 | B2 | 9/2008 | Woollen |
| 7,478,385 | B2 | 1/2009 | Sierer |
| 7,496,888 | B2 | 2/2009 | Sanjar et al. |
| 7,526,759 | B2 | 4/2009 | Sanjar et al. |
| 2001/0049595 | A1 * | 12/2001 | Plumer et al. ................. 703/22 |
| 2001/0052108 | A1 * | 12/2001 | Bowman-Amuah ............ 717/1 |
| 2002/0066073 | A1 | 5/2002 | Lienhard et al. |
| 2002/0073094 | A1 | 6/2002 | Becker et al. |
| 2002/0091990 | A1 | 7/2002 | Little et al. |
| 2002/0138441 | A1 | 9/2002 | Lopatic |
| 2003/0032406 | A1 * | 2/2003 | Minear et al. ............... 455/410 |
| 2003/0037327 | A1 | 2/2003 | Cicciarelli et al. |
| 2003/0156719 | A1 | 8/2003 | Cronce |
| 2003/0177018 | A1 | 9/2003 | Hughes |
| 2003/0217011 | A1 * | 11/2003 | Peinado et al. ................ 705/59 |
| 2003/0222906 | A1 | 12/2003 | Fish et al. |
| 2004/0003274 | A1 * | 1/2004 | Strom et al. ................. 713/193 |
| 2004/0025155 | A1 | 2/2004 | Sedlack et al. |
| 2004/0039916 | A1 | 2/2004 | Aldis et al. |
| 2004/0044514 | A1 | 3/2004 | Granny et al. |
| 2004/0107414 | A1 | 6/2004 | Bronicki et al. |
| 2004/0122645 | A1 | 6/2004 | Shevenell et al. |
| 2004/0143810 | A1 | 7/2004 | Ahmed et al. |
| 2004/0177002 | A1 | 9/2004 | Abelow |
| 2004/0181771 | A1 | 9/2004 | Anonsen et al. |
| 2004/0221267 | A1 | 11/2004 | Chase et al. |
| 2004/0260715 | A1 | 12/2004 | Mongeon et al. |
| 2005/0102240 | A1 * | 5/2005 | Misra et al. ................... 705/59 |
| 2005/0114240 | A1 | 5/2005 | Watson-Luke et al. |
| 2005/0262462 | A1 | 11/2005 | Janakiraman et al. |
| 2006/0230314 | A1 | 10/2006 | Sanjar et al. |
| 2006/0235760 | A1 | 10/2006 | Sanjar et al. |
| 2006/0271581 | A1 | 11/2006 | Sanjar et al. |

OTHER PUBLICATIONS

<Author: Sai Ho Kwok, Title: Digital Right Mangement for the Online Music Business, Date:Aug. 2003, Publisher: ACM SIGecom Exchange, vol. 3, pp. 1-8.>.*

Quatrani, Terry; "Visual Modeling with Rational Rose and UML", Dec. 18, 1997, Chapters 1-12.

Template Software Inc. (Dulles, VA), "Using the WFT Development Environment", copyright 1998.

Template Software Inc. (Dulles, VA), "Developing a WFT Workflow System", copyright 1998.

IBM, "IBM Tivoli Contract Compliance Manager", 2 pages, downloaded on Aug. 25, 2005 from http://www-306.ibm.com/software/tivoli/products/contract-compliance-mgr/.

IBM, "IBM Tivoli License Manager", 2 pages, downloaded on Aug. 25, 2005 from http://www-306.ibm.com/software/tivoli/products/license-mgr.

IBM, "Introducing IBM Tivoli License Manager", 330 pages, downloaded on Aug. 25, 2005 from http://ibm.com/redbooks.

USTPO, Image File Wrapper contents from U.S. Appl. No. 11/127,846, now abandoned, retrieved from http://www.uspto.com private PAIR on Dec. 10, 2009, including non-patent literature and foreign patent copies.

Fossati, F., A.; Abstract of "Software Solution for Automatic Testing", AN-3270053;1988; found in USPTO IFW citation #1 above.

IEEE Colloquium on Automated Testing and Software Solutions; Abstract, AN-4218601; 1992, found in USPTO IFW citation #1 above.

Hill, P.; Abstract of "Quality Software Solutions", AN-4218609; 1992, found in USPTO IFW citation #1 above.

Krzanik, L.; "Enactable Models for Quantitative Evolutionary Software Processes", Institute of Automatics, Academy of Mining and Metallurgy, Krakow, Poland 1988, found in USPTO IFW citation #1 above.

Quatrani, Terry; "Visual Modeling with Rational Rose and UML", Dec. 18, 1997, Chapters 1-12, found in USPTO IFW citation #1 above.

Template Software Inc. (Dulles, VA), "Using the WFT Development Environment", copyright 1998, found in USPTO IFW citation #1 above.

Template Software Inc. (Dulles, VA), "Developing a WFT Workflow System", copyright 1998, found in USPTO IFW citation #1 above.

Quatrani, Terry; "Visual Modeling with Rational Rose and UML", Dec. 18, 1997, Chapters 1-12.

Template Software Inc. (Dulles, VA), "Using the WFT Development Environment", copyright 1998.

Template Software Inc. (Dulles, VA), "Developing a EFT Workflow System", copyright 1998.

Wreder, K, Oeng, Y.. "Architecture-centered enterprise system development and integration based on distributed objecttechnology standard." Computer Software and Applications Conference (1999): 250-258.

USPTO. Image File Wrapper from U.S. Appl. No. 11/101,604, now U.S.patent 7,496,888, retrieved on Dec. 14, 2009 from http://www.uspto.gov.

USPTO, Image File Wrapper contents from U.S. Appl. No. 11/109,038, now issued as US Patent 7,526,759; retrieved from http://www.uspto.com private PAIR on Dec. 10, 2009.

Visual Modeling with Rational Rose and UMl, Terry Quantrani, Dec. 18, 1997, Chapters 1-12. Image is not available via public PAIR; please refer to IFW.

Template Workflow Template Process Foundation, Using the WFT Development Environment (ENV) Whole Manual, copy right 1998. Image is not available via public PAIR; please refer to IFW.

Template Workflow Template Process Foundation, Developing a EFT System (WFT) Whole manual, copy right 1998. Image is not available via public PAIR; please refer to IFW.

"J2EE(TM) Developer's Guide, Overview, J2EE Applications", downloaded from http://java.sun.com/J2ee!sdk_1.2.1/techdocs/guides/ejb/html/Overview5.html on May 10, 2005, 5 pages.

IBM Corp.; "Interpretation of UML model elements by UML-to-EJB transformations", retrieved on May 6, 2009 from http://publib.boulder.ibm.com/infocenter/.

Sun Microsystems; "7.4 Deployment Descriptors"; retrieved on May 6, 2009 from http://java.sun.com/blueprints/guidelines!.

Ambler, Scott w.; "UML 2 Deployment Diagrams"; retrieved on May 6, 2009 from http://www.agilemodeling.com/artifacts/deploymentDiagram.htm.

Quantrani, Terry; "Visual Modeling with Rational Rose and UML"; Dec. 18, 1997; chapters 1-12, cited by examiner in U.S. Appl. No. 11/109,038, found in USPTO IFW citation #1 above.

Template Workflow Template Process Foundation, Using the WFT Development Environment (ENV), whole manual, copyright 1998, cited by examiner in U.S. Appl. No. 11/1109,038.

Template Workflow Template Process Foundation, Developing a WFT System (WFT), whole manual, copyright 1998, cited by examiner in U.S. Appl. No. 11/109,038.

"IBM WebSphere V5.0 for Linux, Implementation and Deployment Guide WebSphere Handbook Series", by Mark Endrei, et al., published by International Business Machines Corp., copyright Feb. 2003, downloaded from http:// Dwww.ibm.comlredbooks, 158 pages. Found in USPTO IFW citation #1 above.

USPTO, Image File Wrapper from U.S. Appl. No. 11/109,069, retrieved on Dec. 10, 2009 from http://www.uspto.gov, including non-patent literature for items #1-8 above.

USTPO, Image File Wrapper contents from U.S. Appl. No. 11/211,950, now pending, retrieved from http://www.uspto.com private PAIR on Dec. 10, 2009, including non-patent literature.

"BEAWeblogic Platform™: Deploying WebLogic Platform Application," BEA Systems, Dec. 2004, pp. i-viii, "1-1" through "B-16" (172 total pages), found in USPTO IFW citation #1 above.

'IBM WebSphere V5.0for Linux, Implementation and Deployment Guide WebSphere Handbook Series', by Mark Endrei, et al., published by International Business Machines Corp., copyright Feb. 2003, downloaded from http://www.ibm.comlredbooks, 158 pages, found in USPTO IFW citation #1 above.

'J2EE(TM) Developer's Guide, Overview, J2EE Applications', downloaded fromo http://java.sun.com/j2ee/sdk_1.2.1/techdocs/guides/ejblhtml/Overview5.html on May 10, 2005, 5 pages, found in USPTO IFW citation #1 above.

'Packaging Applications', downloaded from http://java.sun.comlj2ee/1.4/docsltutorialldoc/Overview5.html on May 20, 2005, 2 pages, found in USPTO IFW citation #1 above.

Quatrani, Terry; "Visual Modeling with Rational Rose and UML", Dec. 18, 1997, Chapters 1-12, found in USPTO IFW citation #1 above.

Template Software Inc. (Dulles, VA), "Using the WFT Development Environment", copyright 1998, found in USPTO IFW citation #1 above.

Template Software Inc. (Dulles, VA), "Developing a WFT Workflow System", copyright 1998, found in USPTO IFW citation #1 above.

\* cited by examiner

Example UML Model in XML for a Database Component

```xml
<?xml version="1.0" encoding="UTF-8"?>
<!DOCTYPE itemDefinition SYSTEM "itemDefinition.dtd" >
<itemDefinition>
 <productName>DB2 UDB Enterprise Edition 8.1.2</productName>
  <item itemDelimiter="" itemState="M" itemType="STANZA">
    <itemDescription>Description</itemDescription>
    <itemValue>Value/Choice</itemValue>
    <itemName>Installation Parameter Name</itemName>
    <item itemDelimator="," itemState="M" itemType="CHOICE">
       <itemDescription>Product type to be installed.
    Only one can be selected.
    </itemDescription>
       <itemValue>ENTERPRISE_SERVER_EDITION</itemValue>
    <itemValues>
    ENTERPRISE_SERVER_EDITION,
    APPLICATION_DEVELOPMENT_CLIENT,
    CONNECT_PERSONAL_EDITION,
    CONNECT_ENTERPRISE_EDITION, DATA_LINKS_MANAGER,
    DB2_HTML_DOCUMENTATION,ADMINISTRATION_CLIENT,
    LIFE_SCIENCES_DATA_CONNECT,PERSONAL_EDITION,
    RELATIONAL_CONNECT,RUNTIME_CLIENT,
    SPATIAL_EXTENDER, WAREHOUSE_MANAGER,WAREHOUSE_MANAGER_CONNECTORS,
    WORKGROUP_SERVER_EDITION
     </itemValues>
         <itemName>PROD</itemName>
   </item>
</itemDefinition>
```

Figure 10

Example Item Description DTD

```
<?xml version="1.0" encoding="UTF-8"?>
<!ELEMENT itemDefinition (productName, item+)>
<!ELEMENT productName (#PCDATA)>
<!ELEMENT item
(itemDescription, itemValue, itemValues?,
itemName,item*)
>
<!ELEMENT itemDescription (#PCDATA)>
<!ELEMENT itemValue (#PCDATA)>
<!ELEMENT itemValues (#PCDATA)>
<!ELEMENT itemName (#PCDATA)>
<!ATTLIST item
itemType CDATA #REQUIRED
itemState CDATA #REQUIRED
itemDelimator CDATA #REQUIRED
>
```

Figure 11

Example MQ Version 5.3 Description in XML

```xml
<?xml version="1.0" encoding="UTF-8"?>
<!DOCTYPE itemDefinition SYSTEM "itemDefinition.dtd" >
<itesmDefinition>
 <productName>Websphere MQ 5.3</productName>
 <item itemDelimator="" itemState="M" itemType="STANZA">
   <itemDescription>Description</itemDescription>
   <itemValue>Value/Choice</itemValue>
   <itemName>Response</itemName>
   <item itemState="O" itemType="TEXT" itemDelimator="">
     <itemDescription>'Folder for the WebSphere MQ program files. For
       example,c:\mqm.</itemDescription>
     <itemValue>"C:\Program Files\IBM\Websphere MQ"</itemValue>
     <itemName>PGMFOLDER</itemName>
   </item>
   <item itemState="O" itemType="TEXT" itemDelimator="">
     <itemDescription>Folder for the WebSphere MQ data files. For example,
       c:\mqm\data.</itemDescription>
     <itemValue>"C:\Program Files\IBM\Websphere MQ\Data"</itemValue>
     <itemName>DATFOLDER</itemName>
   </item>
   <item itemState="O" itemType="TEXT" itemDelimator="">
     <itemDescription>Folder for the WebSphere MQ queue manager log files.
       For example, c:\mqm\log.</itemDescription>
     <itemValue>"C:\Program Files\IBM\Websphere MQ\Log"</itemValue>
     <itemName>LOGFOLDER</itemName>
   </item>
   <item itemState="M" itemType="CHOICE" itemDelimator=",">
     <itemDescription>Accept the terms of the license. For a silent installation,
       this must be set to yes.</itemDescription>
     <itemValue>Yes</itemValue>
     <itemValues>Yes,No</itemValues>
     <itemName>AGREETOLICENSE</itemName>
   </item>
   <item itemState="O" itemType="CHOICE" itemDelimator=",">
     <itemDescription>If the Server feature is to be uninstalled, whether to
       delete any existing queue managers. delete removes any existing
       queue managers. keep, or any other value, keeps
       them</itemDescription>
     <itemValue>Keep</itemValue>
     <itemValues>Keep,Delete</itemValues>
     <itemName>KEEPQMDATA</itemName>
   </item>
   <item itemState="O" itemType="CHOICE" itemDelimator=",">
     <itemDescription>If the WebAdmin feature is already installed from a
       previous version of MQSeries, it will be uninstalled. This property
       gives you the option to delete the existing Web Administration
       scripts. delete removes any existing Web Administration scripts.
       keep, or any other value, keeps them</itemDescription>
     <itemValue>Keep</itemValue>
     <itemValues>Keep,Delete</itemValues>
     <itemName>KEEPWEBDATA</itemName>
   </item>
```

Figure 12a

Example MQ Version 5.3  Description in XML  (continued)

```xml
<item itemState="0" itemType="MULTI_CHOICE" itemDelimator=",">
    <itemDescription>List of features to install locally. All installs all features
       Default installs the typical features. If you do not want a feature use
       REMOVE=feature. The valid features are listed in the table
       below</itemDescription>
    <itemValue>ALL</itemValue>
    <itemValues>ALL,Server,GuiAdmin,Client,JavaMsg,Toolkit</itemValues>
    <itemName>ADDLOCAL</itemName>
  </item>
  <item itemState="0" itemType="CHOICE" itemDelimator=",">
    <itemDescription>Start the WebSphere MQ Service at the end of
       installation.</itemDescription>
    <itemValue>Yes</itemValue>
    <itemValues>Yes,No</itemValues>
    <itemName>STARTSERVICE</itemName>
  </item>
  <item itemState="0" itemType="CHOICE" itemDelimator=",">
    <itemDescription>Start the WebSphere MQ taskbar application at the end
       of installation. . (The default) Start the WebSphere MQ taskbar
       application at the end of installation if it was running at the start, or
       if this is a new installation. Anything else. Start the taskbar
       application at the end of the installation. Ignored if the server
       feature is not installed.</itemDescription>
    <itemValue>Yes</itemValue>
    <itemValues>Yes,No</itemValues>
    <itemName>STARTTASKBAR</itemName>
  </item>
</item>
<item itemState="0" itemType="STANZA" itemDelimator="">
  <itemDescription>Contains general properties related to how the MQParms
     command runs and to the installation of WebSphere MQ. Valid values are
     listed in "MSI Stanza" table</itemDescription>
  <itemValue>Value/Choice</itemValue>
  <itemName>MSI</itemName>
  <item itemState="0" itemType="CHOICE" itemDelimator=",">
    <itemDescription>system. Install using the language of the default system
       locale (the default).\nuser. Install using the language of the default locale of
       the user.</itemDescription>
    <itemValue>system</itemValue>
    <itemValues>system,user</itemValues>
    <itemName>MQPLANGUAGE</itemName>
  </item>
  <item itemState="0" itemType="TEXT" itemDelimator=",">
    <itemDescription>MQParms generates a text log file with the specified
       name and location.</itemDescription>
    <itemValue>path\file_name</itemValue>
    <itemName>MQPLOG</itemName>
  </item>
</item>
<item itemDelimator="" itemState="0" itemType="STANZA">
  <itemDescription>Description</itemDescription>
  <itemValue>Values</itemValue>
  <itemName>Services Stanza</itemName>
  <item itemDelimator="," itemState="0" itemType="CHOICE">
    <itemDescription>The type of user account to use. local. Creates a local
       user account. domain. Uses the domain user account specified by
       DOMAINNAME, USERNAME, and PASSWORD. Do not use
       double quotes</itemDescription>
    <itemValue>local</itemValue>
    <itemValues>local,domain</itemValues>
    <itemName>USERTYPE</itemName>
  </item>
</item>

</itemDefinition>
```

Figure 12b

Example WAS Version 5.1 Description in XML

```xml
<?xml version="1.0" encoding="UTF-8"?>
<!DOCTYPE itemDefinition SYSTEM "itemDefinition.dtd" >
<itemDefinition>
  <productName>WebSphere Application Server 5.1</productName>
  <item itemDelimator="" itemState="M" itemType="STANZA">
    <itemDescription>Description</itemDescription>
    <itemValue>Value/Choice</itemValue>
    <itemName>Parameter Name</itemName>
    <item itemDelimator="," itemState="M" itemType="CHOICE">
      <itemDescription>Custom installation, or full installation</itemDescription>
      <itemValue>custom</itemValue>
      <itemValues>custom,full</itemValues>
      <itemName>-W setupTypes.selectedSetupTypeId</itemName>
    </item>
    <item itemDelimator="," itemState="O" itemType="CHOICE">
    <itemDescription>Silent install</itemDescription>
    <itemValue>silent</itemValue>
    <itemValues>silent,not-silent</itemValues>
    <itemName>-silent</itemName>
    </item>
    <item itemDelimator="" itemState="O" itemType="TEXT">
    <itemDescription>Install location for WAS.  </itemDescription>
    <itemValue>"C:\Program Files\WebSphere\AppServer"</itemValue>
    <itemName>-P wasBean.installLocation</itemName>
    </item>
    <item itemDelimator="" itemState="O" itemType="TEXT">
    <itemDescription>This value is required if you choose to install IBM HTTP Server(IHS).
If the location has a previous IHS installed, please delete all contents in the
corresponding folder.  Uninstall the previous IHS is not
sufficient.</itemDescription>
    <itemValue>"C:\Program Files\IBMHTTPServer"</itemValue>
    <itemName>-P ihsFeatureBean.installLocation</itemName>
    </item>
    <item itemDelimator="," itemState="O" itemType="CHOICE">
    <itemDescription>To install the application server.</itemDescription>
    <itemValue>true</itemValue>
    <itemValues>true,false</itemValues>
    <itemName>-P serverBean.active</itemName>
    </item>
    <item itemDelimator="," itemState="O" itemType="CHOICE">
    <itemDescription>To install the amininstration features.</itemDescription>
    <itemValue>true</itemValue>
    <itemValues>true,false</itemValues>
    <itemName>-P adminBean.active</itemName>
    </item>
    <item itemDelimator="" itemState="O" itemType="CHOICE">
    <itemDescription>To install Scripting Administration features.</itemDescription>
    <itemValue>true</itemValue>
    <itemValues>true,false</itemValues>
    <itemName>-P adminScriptingFeatureBean.active</itemName>
    </item>
    <item itemDelimator="," itemState="O" itemType="CHOICE">
    <itemDescription>To install Administrative Console.</itemDescription>
    <itemValue>true</itemValue>
    <itemValues>true,false</itemValues>
    <itemName>-P adminConsoleFeatureBean.active</itemName>
    </item>
    <item itemDelimator="," itemState="O" itemType="CHOICE">
    <itemDescription>To install application Assembly and Deployment
```

Figure 13a

<u>Example WAS Version 5.1 Description in XML (cont.)</u>
```
tools.</itemDescription>
    <itemValue>true</itemValue>
    <itemValues>true,false</itemValues>
    <itemName>-P applicationAndAssemblyToolsBean.active </itemName>
    </item>
    <item itemDelimator="," itemState="0" itemType="CHOICE">
    <itemDescription>To install Deploy tools.</itemDescription>
    <itemValue>true</itemValue>
    <itemValues>true,false</itemValues>
    <itemName>-P deployToolBean.active</itemName>
    </item>
    <item itemDelimator="," itemState="0" itemType="CHOICE">
    <itemDescription>To install Ant Utilities</itemDescription>
    <itemValue>true</itemValue>
    <itemValues>true,false</itemValues>
    <itemName>-P antUtilityBean.active</itemName>
    </item>
    <item itemDelimator="," itemState="0" itemType="CHOICE">
    <itemDescription>To install Embedded Messaging</itemDescription>
    <itemValue>true</itemValue>
    <itemValues>true,false</itemValues>
    <itemName>-P mqSeriesBean.active</itemName>
    </item>
    <item itemDelimator="," itemState="0" itemType="CHOICE">
    <itemDescription>To install Embedded Messaging Server and Client.</itemDescription>
    <itemValue>true</itemValue>
    <itemValues>true,false</itemValues>
    <itemName>-P mqSeriesServerBean.active</itemName>
    </item>
    <item itemDelimator="" itemState="0" itemType="TEXT">
    <itemDescription>Install location for Embedded Messaging Server and
Client.</itemDescription>
    <itemValue>"C:\Program Files\IBM\WebSphereMQ"</itemValue>
    <itemName>-P mqSeriesServerBean.installLocation</itemName>
    </item>
    <item itemDelimator="," itemState="0" itemType="CHOICE">
    <itemDescription>To install Embedded Messaging Client only.  Only one of installing
Embedded Messageing of Server and Client, or installing Embedded Messaging of
Client  can be chosen.</itemDescription>
    <itemValue>false</itemValue>
    <itemValues>false,true</itemValues>
    <itemName>-P mqSeriesClientBean.active</itemName>
    </item>
    <item itemDelimator="" itemState="0" itemType="TEXT">
    <itemDescription>Install location for Embedded Messaging Client.</itemDescription>
    <itemValue>"C:\Program Files\IBM\WebSphereMQ"</itemValue>
    <itemName>-P mqSeriesClientBean.installLocation</itemName>
    </item>
    <item itemDelimator="," itemState="0" itemType="CHOICE">
    <itemDescription>To install Message-Driven bean samples.</itemDescription>
    <itemValue>true</itemValue>
    <itemValues>true,false</itemValues>
    <itemName>-P mqSeriesSamplesBean.active</itemName>
    </item>
    <item itemDelimator="," itemState="0" itemType="CHOICE">
    <itemDescription>To install IHS Web Server 1.3.28.</itemDescription>
    <itemValue>true</itemValue>
    <itemValues>true,false</itemValues>
    <itemName>-P ihsFeatureBean.active</itemName>
    </item>
```

Figure 13b

Example WAS Version 5.1 Description in XML (cont.)

```xml
<item itemDelimator="," itemState="0" itemType="CHOICE">
<itemDescription>To install Web Server Plugins.</itemDescription>
<itemValue>true</itemValue>
<itemValues>true,false</itemValues>
<itemName>-p pluginBean.active </itemName>
</item>
<item itemDelimator="," itemState="0" itemType="CHOICE">
<itemDescription>To install IBM HTTP Server V1.3 Plugin.</itemDescription>
<itemValue>true</itemValue>
<itemValues>true,false</itemValues>
<itemName>-P ihsPluginBean.active</itemName>
</item>
<item itemDelimator="," itemState="0" itemType="CHOICE">
<itemDescription>To install IBM HTTP Server V2.0 Plugin.</itemDescription>
<itemValue>false</itemValue>
<itemValues>false,true</itemValues>
<itemName>-P ihs20PluginBean.active</itemName>
</item>
<item itemDelimator="," itemState="0" itemType="CHOICE">
<itemDescription>To install Apache Web Server V1.3 Plugin.</itemDescription>
<itemValue>false</itemValue>
<itemValues>false,true</itemValues>
<itemName>-P apachePluginBean.active </itemName>
</item>
<item itemDelimator="," itemState="0" itemType="CHOICE">
<itemDescription>To install Apache Web Server V2.0 Plugin.</itemDescription>
<itemValue>false</itemValue>
<itemValues>false,true</itemValues>
<itemName>-P apache20PluginBean.active</itemName>
</item>
<item itemDelimator="," itemState="0" itemType="CHOICE">
<itemDescription>To install Microsoft Internet Information Services (IIS)
Plugin.</itemDescription>
<itemValue>false</itemValue>
<itemValues>false,true</itemValues>
<itemName>-P iisPluginBean.active</itemName>
</item>
<item itemDelimator="," itemState="0" itemType="CHOICE">
<itemDescription>To install iPlanet Web Server Plugin.</itemDescription>
<itemValue>false</itemValue>
<itemValues>false,true</itemValues>
<itemName>-P iplanet60PluginBean.active</itemName>
</item>
<item itemDelimator="," itemState="0" itemType="CHOICE">
<itemDescription>To install Domino Web Server Plugin.</itemDescription>
<itemValue>flase</itemValue>
<itemValues>false, true</itemValues>
<itemName>-P dominoPluginBean.active</itemName>
</item>
<item itemDelimator="," itemState="0" itemType="CHOICE">
<itemDescription>To install samples.</itemDescription>
<itemValue>true</itemValue>
<itemValues>true,false</itemValues>
<itemName>-P samplesBean.active </itemName>
</item>
<item itemDelimator="," itemState="0" itemType="CHOICE">
<itemDescription>To install performance and analysis tools.</itemDescription>
<itemValue>true</itemValue>
<itemValues>true,false</itemValues>
<itemName>-P performanceAndAnalysisToolsBean.active</itemName>
</item>
```

Figure 13c

Example WAS Version 5.1 Description in XML (cont.)

```xml
<item itemDelimator="," itemState="0" itemType="CHOICE">
<itemDescription>To install Tivoli Performance Viewer.</itemDescription>
<itemValue>true</itemValue>
<itemValues>true,fallse</itemValues>
<itemName>-P tivoliPerfBean.active</itemName>
</item>
<item itemDelimator="," itemState="0" itemType="CHOICE">
<itemDescription>To install Dynamic Cache Monitor.</itemDescription>
<itemValue>false</itemValue>
<itemValues>true,false</itemValues>
<itemName>-P DCMBean.active</itemName>
</item>
<item itemDelimator="," itemState="0" itemType="CHOICE">
<itemDescription>To install Performance Servlet.</itemDescription>
<itemValue>true</itemValue>
<itemValues>true,false</itemValues>
<itemName>-P performanceServletBean.active</itemName>
</item>
<item itemDelimator="," itemState="0" itemType="CHOICE">
<itemDescription>To install Log Analyzer.</itemDescription>
<itemValue>true</itemValue>
<itemValues>true,false</itemValues>
<itemName>-P logAnalyzerBean.active</itemName>
</item>
<item itemDelimator="," itemState="0" itemType="CHOICE">
<itemDescription>To install Javadocs</itemDescription>
<itemValue>true</itemValue>
<itemValues>true,false</itemValues>
<itemName>-P javadocBean.active</itemName>
</item>
<item itemDelimator="" itemState="0" itemType="TEXT">
<itemDescription>The node name is used for administration, and must be unique within its group of notes (cell). Replace the "DefaultNode" with your node name. For migration from previous version, use the same node name as the one in previous version. </itemDescription>
<itemValue>DefaultNode</itemValue>
<itemName>-W nodeNameBean.nodeName</itemName>
</item>
<item itemDelimator="" itemState="0" itemType="TEXT">
<itemDescription>Enter a resolveable hostname or IP address of your machine. </itemDescription>
<itemValue>127.0.0.1</itemValue>
<itemName>-W nodeNameBean.hostName</itemName>
</item>
<item itemDelimator="," itemState="0" itemType="CHOICE">
<itemDescription>To install services for IHS and Websphere Application Server on Windows. Using the services, you can start and stop the services.</itemDescription>
<itemValue>true</itemValue>
<itemValues>true,false</itemValues>
<itemName>-W serviceSettingsWizardBean.active</itemName>
</item>
<item itemDelimator="," itemState="0" itemType="CHOICE">
<itemDescription>To install IHS Services. If it sets to be "true", it requires -W
```

Figure 13d

Example WAS Version 5.1 Description in XML (cont.)

```
serviceSettingWizardBean.active also set to be "true".</itemDescription>
    <itemValue>true</itemValue>
    <itemValues>true,false</itemValues>
    <itemName>-W serviceSettingsWizardBean.ihsChoice</itemName>
    </item>
    <item itemDelimator="," itemState="O" itemType="CHOICE">
    <itemDescription>To install the WebSphere Application Server Service. If it sets to be
"true", it requires -W serviceSettingWizardBean.active also set to be
"true".</itemDescription>
    <itemValue>true</itemValue>
    <itemValues>true,false</itemValues>
    <itemName>-W serviceSettingsWizardBean.wasChoice</itemName>
    </item>
    <item itemDelimator="" itemState="O" itemType="TEXT">
    <itemDescription>User ID for installing the Services. It is required if  -W
serviceSettingsWizardBean.ihsChoice = "true" or -W
serviceSettingsWizardBean.wasChoice="true". The ID must be an admin, or must
have admin authority to install a Service. The ID must also have "Log on as a
Service" authority.</itemDescription>
    <itemValue>installation user ID</itemValue>
    <itemName>-W serviceSettingsWizardBean.userName</itemName>
    </item>
    <item itemDelimator="" itemState="C" itemType="TEXT">
    <itemDescription>It is required if -W serviceSettingsWizardBean.ihsChoice = "true" or -W
serviceSettingsWizardBean.wasChoice="true". The password much be the same as
the one for the OS., otherwise, the installation will not continue.</itemDescription>
    <itemValue> </itemValue>
    <itemName>-W serviceSettingsWizardBean.password</itemName>
    </item>
    <item itemDelimator="," itemState="O" itemType="CHOICE">
    <itemDescription>To install the launcher icon for start server.</itemDescription>
    <itemValue>true</itemValue>
    <itemValues>true,false</itemValues>
    <itemName>-P StartServerIconBean.active</itemName>
    </item>
    <item itemDelimator="," itemState="O" itemType="CHOICE">
    <itemDescription>To install the launcher icon for stop server.</itemDescription>
    <itemValue>true</itemValue>
    <itemValues>true,false</itemValues>
    <itemName>-P StopServerIconBean.active</itemName>
    </item>
    <item itemDelimator="," itemState="O" itemType="CHOICE">
    <itemDescription>To install the launcher icon for AdminConsole.</itemDescription>
    <itemValue>true</itemValue>
    <itemValues>true,false</itemValues>
    <itemName>-P AdminConsolIconBean.active</itemName>
    </item>
    <item itemDelimator="," itemState="O" itemType="CHOICE">
    <itemDescription>To install the launcher icon for the samples gallery.</itemDescription>
    <itemValue>true</itemValue>
    <itemValues>true,false</itemValues>
    <itemName>-P SamplesGalleryIconBean.active</itemName>
    </item>
    <item itemDelimator="," itemState="O" itemType="CHOICE">
    <itemDescription>To install  the launcher icon for the Tivoli - -
```

Figure 13e

Example WAS Version 5.1 Description in XML (cont.)

```xml
Performance.</itemDescription>
    <itemValue>true</itemValue>
    <itemValues>true,false</itemValues>
    <itemName>-P TivoliPerfIconBean.active</itemName>
    </item>
    <item itemDelimator="," itemState="0" itemType="CHOICE">
    <itemDescription>To install the launcher icon for the corresponding
component.</itemDescription>
    <itemValue>true</itemValue>
    <itemValues>true,false</itemValues>
    <itemName>-P infoCenterIconBean.active </itemName>
    </item>
    <item itemDelimator="," itemState="0" itemType="CHOICE">
    <itemDescription>To install the launcher icon for the FirstSteps.</itemDescription>
    <itemValue>true</itemValue>
    <itemValues>true,flase</itemValues>
    <itemName>-P firstStepsIconBean.active</itemName>
    </item>
    <item itemDelimator="," itemState="0" itemType="CHOICE">
    <itemDescription>To install the launcher for the LogAnalyzer</itemDescription>
    <itemValue>true</itemValue>
    <itemValues>true,false</itemValues>
    <itemName>-P logAnalyzerIconBean.active</itemName>
    </item>
    <item itemDelimator="" itemState="0" itemType="TEXT">
    <itemDescription>Change the path to the prerequisite checker configuration file only if
a new
file has been provided. Make sure the corresponding DTD is also presented in the
same path.</itemDescription>
    <itemValue>waspc/prereqChecker.xml</itemValue>
    <itemName>-W osLevelCheckActionBean.configFilePath</itemName>
    </item>
    <item itemDelimator="" itemState="C" itemType="TEXT">
    <itemDescription>If -P ihsPluginBean.active="true", and -P
ihsFeatureBean.active="false", it
is required. It should be the fully qualified path, including the config file
name.</itemDescription>
    <itemValue>"C:\Program Files\IBMHTTPServer\conf\httpd.conf"</itemValue>
    <itemName>-W defaultIHSConfigFileLocationBean.value</itemName>
    </item>
    <item itemDelimator="" itemState="C" itemType="TEXT">
    <itemDescription>If -P ishPluginBean.active="true, it is required. It should be the
fully qualified path, including the config file name.</itemDescription>
    <itemValue>Location of the config file</itemValue>
    <itemName>-W defaultIHS20ConfigFileLocationBean.value</itemName>
    </item>
    <item itemDelimator="" itemState="C" itemType="TEXT">
    <itemDescription>If -P apachePluginBean.active ="true", it is required. It should be
the fully
qualified path, including the config file name.</itemDescription>
    <itemValue>Location of the config file </itemValue>
    <itemName>-W defaultApacheConfigFileLocationBean.value</itemName>
    </item>
    <item itemDelimator="" itemState="C" itemType="TEXT">
    <itemDescription>If -P apache20PluginBean.active="true", it is required. It should be
the
```

Figure 13f

Example WAS Version 5.1 Description in XML (cont.)

```
fully qualified path, including the config file name.</itemDescription>
    <itemValue>Location of the config file</itemValue>
    <itemName>-W defaultApache20ConfigFileLocationBean.value</itemName>
    </item>
    <item itemDelimator="" itemState="C" itemType="TEXT">
    <itemDescription>If -P iplanet60PluginBean.active="true", it is required.  It should be
the
fully qualified path, including the config file name.</itemDescription>
    <itemValue>Location of the config file</itemValue>
    <itemName>-W defaultIPlanetConfigFileLocationBean.value</itemName>
    </item>
    <item itemDelimator="" itemState="C" itemType="TEXT">
    <itemDescription>If -P dominoPluginBean.active="true", it is required.  It should be the
fully qualified path, including the Jar file name.</itemDescription>
    <itemValue>Location of the Jar file</itemValue>
    <itemName>-W dominoPanelBean.notesJarFile</itemName>
    </item>
    <item itemDelimator="" itemState="C" itemType="TEXT">
    <itemDescription>If -P dominoPluginBean.active="true", it is required.  It should be the
fully
qualified path, including the file name.</itemDescription>
    <itemValue>Location of the file</itemValue>
    <itemName>-W dominoPanelBean.namesFile</itemName>
    </item>
    <item itemDelimator="," itemState="O" itemType="CHOICE">
    <itemDescription>For product registration for silent install.</itemDescription>
    <itemValue>false</itemValue>
    <itemValues>false,true</itemValues>
    <itemName>-W launchPRTBean.active</itemName>
    </item>
    <item itemDelimator="," itemState="O" itemType="CHOICE">
    <itemDescription>To install the default Applications</itemDescription>
    <itemValue>true</itemValue>
    <itemValues>true,false</itemValues>
    <itemName>-W installSampleAppSequenceBean.active</itemName>
    </item>
    <item itemDelimator="," itemState="O" itemType="CHOICE">
    <itemDescription>To display First Steps at the end of the
installation.</itemDescription>
    <itemValue>false</itemValue>
    <itemValues>false,true</itemValues>
    <itemName>-W firstStepsSequenceBean.active</itemName>
    </item>
    <item itemDelimator="," itemState="O" itemType="CHOICE">
    <itemDescription>To run the Insallation Verification Tool.</itemDescription>
    <itemValue>true</itemValue>
    <itemValues>true,false</itemValues>
    <itemName>-W installIvtAppSequenceBean.active</itemName>
    </item>
  </item>
</itemDefinition>
```

Figure 13g

AUTOMATIC GENERATION OF LICENSE PACKAGE FOR SOLUTION COMPONENTS

CROSS-REFERENCE TO RELATED APPLICATIONS (CLAIMING BENEFIT UNDER 35 U.S.C. 120)

This patent application is a continuation-in-part of U.S. patent application Ser. No. 11/211,950, filed on Aug. 25, 2005, which was a continuation-in-part of U.S. patent application Ser. No. 11/127,846 filed on May 12, 2005, now abandoned, which was a continuation-in-part of U.S. patent application Ser. No. 11/109,038 filed on Apr. 19, 2005, now U.S. Pat. No. 7,526,759, and of U.S. patent application Ser. No. 11/109,069, filed on Apr. 19, 2005, which were continuations of U.S. patent application Ser. No. 11/101,604, filed on Apr. 7, 2005, now U.S. Pat. No. 7,496,888, all of which are commonly assigned.

FEDERALLY SPONSORED RESEARCH AND DEVELOPMENT STATEMENT

This invention was not developed in conjunction with and Federally sponsored contract.

MICROFICHE APPENDIX

Not applicable.

INCORPORATION BY REFERENCE

The related U.S. patent applications are hereby incorporated by reference in their entireties: Ser. No. 11/211,950, filed on Aug. 25, 2005, Ser. No. 11/127,846 filed on May 12, 2005, Ser. No. 11/109,038 filed on Apr. 19, 2005, Ser. No. 11/109,069, filed on Apr. 19, 2005, and Ser. No. 11/101,604, filed on Apr. 7, 2005.

BACKGROUND OF THE INVENTION

1. Field of the Invention

This invention relates to a Solution Builder Wizard that utilizes templates and interfaces with predefined intelligence to allow speedy assembly of various software components into one cohesive product form.

2. Background of the Invention

Recently, a shift has occurred among enterprise computing supplies to address "vertical markets". These "solutions" targeted to the specific needs, business processes, and problems for a certain industry, such as insurance claim processing, health care insurance filing, mortgage application handling, etc. Industry solutions often consists of one or more operating systems and middleware products that are packaged along with customized, industry specific, data, and code that are installed and configured to function as one cohesive business solution. There are many software and consulting firms who are focused on implementing vertical industry solutions using a collection of disparate products produced by a wide array of vendors.

To implement a vertical industry solution, a single expert is not sufficient to complete the project because it requires expert level skills and knowledge of such a wide array of products, systems, platforms, configurations, options, protocols, etc. Further, all of these different components must be integrated and cooperate with each other in specific, often proprietary ways.

As a result, a team of specialists are usually required to install and deploy the entire project. To mitigate risk, customers often request that a prototype or proof of concept system be installed or demonstrated in order to provide concrete evidence of viability of the solution, and of the business value of the solution, prior to purchase.

This places much engineering and development work up front and before a formal purchase order is issued, which increases the financial risk to the supplier or suppliers. In some cases, it can take eight weeks or even more to gather requirements, and to create a prototype that solves the customer's problems. Then, it can take months to implement and test a prototype, including producing some sort of data which simulates various scenarios and test cases.

This "up front" effort requires a massive amount of time and expenditures in some cases. Because it lasts so long, there is a very real possibility that components (e.g. software applications, operating systems, etc.) will be revised and patched, so the final configuration, if ordered, will have unknown characteristics as the newer releases and patches will also have to be integrated and tested before formal deployment.

Thus, the processes currently employed in the industry place a heavy risk and financial burden on the supplier prior to a sale being completed, which is reflected in the pricing of the final systems to the customers, the increased cost of which must be either absorbed by the customers or passed on to their own clients. In either situation, the customer may either experience reduced profitability, reduced ability to compete on price, or both.

SUMMARY OF THE INVENTION

The present invention utilizes a Graphical User Interface driven model in an integrated development environments ("IDEs"), such as IDE's based upon the open-sourced Eclipse platform, to create diverse end-to-end computing solutions from building block components. The building block components are available in the GUI to the solution developer on a "solution component palette". The solution developer selects, drags and drops instances of each required solution component into a "solution design area", and then connects them together in a logical manner according to system interactions and data flow.

Each time the solution developer specifies or creates a "connection" between two components in the design area, the invention invokes specific logic which determines the needed configuration and option parameters to interface the selected components to each other. This logic provides a "pop-up" dialogue to the solution developer to prompt the user for selections and input. The input information is then used by the logic to configure the two components to interact with each other within the pre-defined constraints and conditions of the logic, thereby relieving the user of needing to be an expert in the configuration and installation of either of the components.

For example, a component palette may include an IBM DB/2 database icon, an IBM WebSphere web server application icon, and an IBM MQ server icon with a backend server such as an IBM 390. The solution developer can drag an instance of the DB/2 icon from the palette to the solution design area of the display, thus making it a component of the current solution. Next, the developer can drag an instance of the WebSphere from the palette to the design area, followed by connecting it to the DB/2 instance, or followed by dragging and dropping more instances of more components.

When a connection between two or more components is made or defined, the invention automatically recognizes the need for customization information for this type of connection, and prompts the developer to enter the required configuration data necessary to make the connection valid and functional, such as user id and password, data source, network address, encryption options, etc. This information is then saved to configuration files which can later be used during actual installation of the system components into the solution.

Prior to deployment or installation of the system solution, the present invention allows the designer to simulate operation and interactions of all of the components using actual data collected from existing customer solutions, simulated data, or a combination of both types of data. During simulation, the solution under design can be debugged using the present invention, which monitors data flow between system components and provides certain diagnostic and analysis capabilities.

Additionally, according to another inventive aspect of the system disclosed herein, licenses for each of the components utilized in the solution under design are automatically obtained, issued, or registered, and placed conveniently in a license package. The user may be notified of components which are used without license, and components for which additional attention is required to obtain a license. Preferably, a license management system and a contract compliance management system are interfaced to the invention to integrate with capabilities that they provide.

BRIEF DESCRIPTION OF THE DRAWINGS

The following detailed description when taken in conjunction with the figures presented herein provide a complete disclosure of the invention.

FIG. 10 shows an example DB2 database model in UML.

FIG. 11 shows an Item Description DTD according to the preferred embodiment for the model of FIG. 10.

FIGS. 12a and 12b show an example item description in XML for an MQ Series server component, also according to the example DTD of FIG. 11.

FIGS. 13a-13g show an example item description in XML for a WAS component according to the example DTD of FIG. 11.

DESCRIPTION OF THE INVENTION

Figure 1:
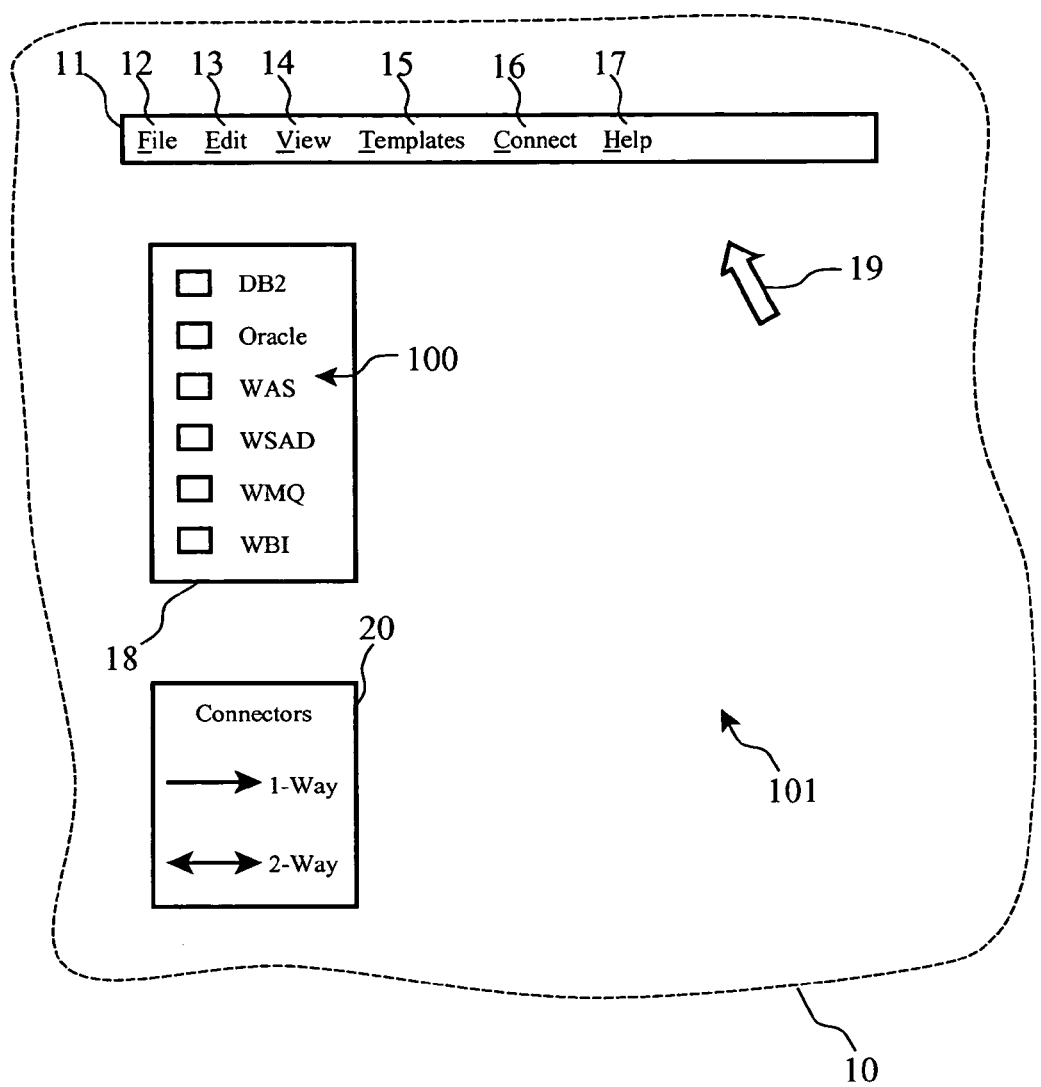
FIG. 1 shows a sample view of the Solution Builder Wizard GUI.

Our invention, referred to as the "Solution Builder Wizard", uses a Graphical User Interface ("GUI"), a set of pre-defined "templates" for each component, and implementation intelligence logic, to enable speedy assembly of various solution components together into one cohesive solution. Each "template" coupled with the implementation logic for each combination of component interfaces defines a set of configuration options and parameters which can be used to customize the combination of components, without need of a high level of expertise in either component. Preferably, the templates incorporate the most common options and configurations employed, leaving out obscure or rarely used options to reduce confusion by the system developer. Default configuration parameters and values may aid in quickly defining interfaces between components so that the system developers must only change the parameters that need to be changed from default values.

Prototypes and proof of concept systems can be quickly achieved using pre-defined interfaces and configurations between disparate components of the solution. Using the invention, a tangible, operable solution can be demonstrated and tested in less time than using traditional processes, because all components are integrated with each other based upon the templates rather than upon customized or semi-customized interface and configuration definitions from various experts.

In an aspect of a preferred embodiment, each component is declared as an object using eXtensible Markup Language for the templates. Because of this advantage, the solution can be defined in a written format which can then be archived and managed by any of the widely available and widely used code repository systems, such as CATIA Viewing Services ("CVS"), IBM's Configuration Management and Version Control ("CMVC") system, Serena™ Software's PVCS Version Manager, or a similar product.

Terms, Definitions and Related Technology

We will first describe some terms and related technologies which will be of use in understanding the present invention and one or more preferred embodiments.

Unified Modeling Language ("UML") is an open standard for notation of modeling of objects in the real-world. The objects can conceivably be any real thing, such as a computer with a specific program, a system device such as a printer, a peripheral such as a motor, etc. Modeling such objects is usually a first step in developing an object-oriented design methodology. UML's notation derives from approaches of three other object-oriented design and analysis methodologies, including Grady Booch's methodology for describing a set of objects and their relationships, James Rumbaugh's Object-Modeling Technique ("OMT"), and Ivar Jacobson's approach which includes a use case methodology, according to one online Information Technology source www<dot>WhatIs<dot>com, wherein <dot> is replaced with a period "." when entering the service's website address into a web browser. The UML standard is now maintained and promoted by the Object Management Group. In the following paragraphs, it shall be understood that references to UML are to one available embodiment, and that use of alternate modeling languages and methodologies may be employed without departing from the spirit and scope of the invention.

Graphical User Interface ("GUI") is a user interface that is based on graphics such as icons, menus, and pictures. In the late 1970's, the Xerox Palo Alto Research Laboratory first created the GUI concept. Today, users are most familiar with either the Apple MAC™ or Microsoft's Windows™ operating systems. Most applications today use the elements of the GUI that come with the operating system and add or modify their own graphical user interface elements for customization. GUI elements can consist of items such as: windows, buttons, iconic images, pull-down menus, wizards, and mouse. Often the phrase "look-and-feel" is use to describe a system's GUI along with its input devices. In the following paragraphs, it shall be understood that references to GUI are to just one available embodiment, and that use of alternate platform and methodologies may be employed without departing from the spirit and scope of the invention.

Eclipse is an open platform tool for integration built by an open community of tool providers such as Borland™, International Business Machines ("IBM")™, and Red Hat™. It is designed to build integrated development environments ("IDEs") which allow the creation of diverse end-to-end computing solutions for multiple computer environments while providing flexibility and management for developers in their software technology. According to the Eclipse Foundation, it has formed an independent open eco-system around royalty-free technology and a universal platform for tools integration. The Eclipse platform is a mechanism for discovering, integrating, and running modules called plug-ins based on the foundation's formal documents and white papers. The plug-in based framework enables ease of creation, integration, and utilization of software tools, in a multi-language, multi-platform, multi-vendor environment. The Eclipse Platform is written in Java language and comes with extensive plug-in construction tool kits and examples. It has been deployed on a range of development workstations including Linux, HP-UX, AIX, Solaris, QNX, OSx, and Windows based systems. In the following paragraphs, it shall be understood that references to Eclipse are to one available embodiment, and that use of alternate platform and methodologies may be employed without departing from the spirit and scope of the invention.

WebSphere Application Server ("WAS") is a comprehensive web services technology-based application server that integrates enterprise data and transactions. It is a complete Java-servlet based Web server environment consisting of two major components: a complete runtime environment and an integrated tools environment. It is a web-based tool that allows management and deployment of dynamic enterprise applications while handling extensive Java 2 Enterprise Edition ("J2EE"), security, scalability, and application performance. According to its product overview, it provides virtually any-to-any connectivity with transaction management and application adaptively, because it is optimized for ease of administration in a scalable, single-server deployment environment. WAS supports key Web Service open standards, such as Simple Object Access Protocol ("SOAP"), Universal Description, Discovery, and Integration ("UDDI"), and Web Service Description Language ("WSDL"). WAS can be used on a variety of platforms such as Sun Solaris, Windows XP, IBM AIX/6000, and IBM LINUX. Other similar products that exists today is BEA Weblogic Application Server™ and JBoss™ own suite of tools. In the following paragraphs, it shall be understood that references to WAS are to just one available embodiment, and that use of alternate platform and methodologies may be employed without departing from the spirit and scope of the invention.

WebSphere Studio Application Developer ("WSAD") is a development environment tool that is role based which developers can use to simulate test environments, handle deployment, and transmit message queues such as XML messages. The WebSphere Studio family of tools are built on top of the Eclipse Workbench as a set of plug-ins conforming to the Eclipse's open standard Application Program Interface ("API"). It is designed for professional developers of Java and J2EE applications who require integrated Java, Web, XML, and Web services support. Because users can build and test business logic inside the WSAD before deploying to a production server, it has the advantages for early detection in performance bottlenecks, and to shorten the actual test cycle with its advanced code generation. All development resources for all projects are stored in a single repository, and users have team support and can easily share work products. In the following paragraphs, it shall be understood that references to WSAD are to just one available embodiment, and that use of alternate platform and methodologies may be employed without departing from the spirit and scope of the invention.

WebSphere Business Integration ("WBI") is a part of WebSphere suite of tools that extends using the Eclipse workbench to model, simulate and manage business integration, workflows, and processes. The WBI brand encompasses a number of software technologies that offer various business integration capabilities such as WBI Modeler, WBI Server, WBI Server Foundation, WBI Message Broker, WBI Connect, WBI Administration Tools, and WBI Design Tools. These tools facilitate users to quickly model, simulate, and analyze complex business scenarios before they are implemented by integrating with existing or new software components. In addition, the administration and design tools allow for ease in system administration and workflow creation which shares some similarities to IBM's Rational™ software. In the following paragraphs, it shall be understood that references to WBI are to just one available embodiment, and that use of alternate platform and methodologies may be employed without departing from the spirit and scope of the invention.

WebSphere MQ ("WMQ") formerly known as IBM's MQ Series is a message queue system that exchanges information such as using XML to communicate across various platforms while integrating new and existing applications. It is a synchronous or asynchronous method of communicating between processes. It allows applications that reside on same server, different servers, or even different network across a global application environments to send and receive reliable and secured requests between each other. WMQ is integrated with latest Java™ Messaging Service interface standard and offers comprehensive security options using the Secure Socket Layer ("SSL"). One feature of WMQ is its ability to dynamically distribute workloads across available resources which enables messages to be delivered error-free and protects from unauthorized access. There are other message queue systems such as Microsoft's Message Queue ("MSMQ")™, Sun Java System Message Queue ("JMS")™, and Progress Software SonicMQ™. In the following paragraphs, it shall be understood that references to WMQ are to just one available embodiment, and that use of alternate platform and methodologies may be employed without departing from the spirit and scope of the invention.

Graphical User Interface

Turning to FIG. 1, the diagram shows a sample view of the Solution Builder Wizard GUI (10) according to a preferred embodiment of the invention. In the GUI, which is shown on a portion of a computer display (10), there is a customizable menu bar toward the top (11) which allows the user the ability to navigate through a file (12), edit the component palette (13), change the view option (14), select a template (15), create a connection between application components (16), or seek help (17) within the GUI application.

The GUI is pre-loaded with various solution components (100) shown in a solution component palette (18), and related intelligence logic based on customization. The available solution components can consists of different types of databases, such as DB2 or Oracle, or other application software such as WAS, WSAD, WMQ, and WBI. According to the preferred embodiment, additional solution component options can be added to the palette (18) as needed.

Connectors (20) that interface solution components with one another are shown in the palette (18), optionally. A cursor (19) is used by a developer to navigate, select, and create a solution design through the GUI, by moving components (100) from the palette (18) to the solution design area (101) of the GUI.

Figure 2A:
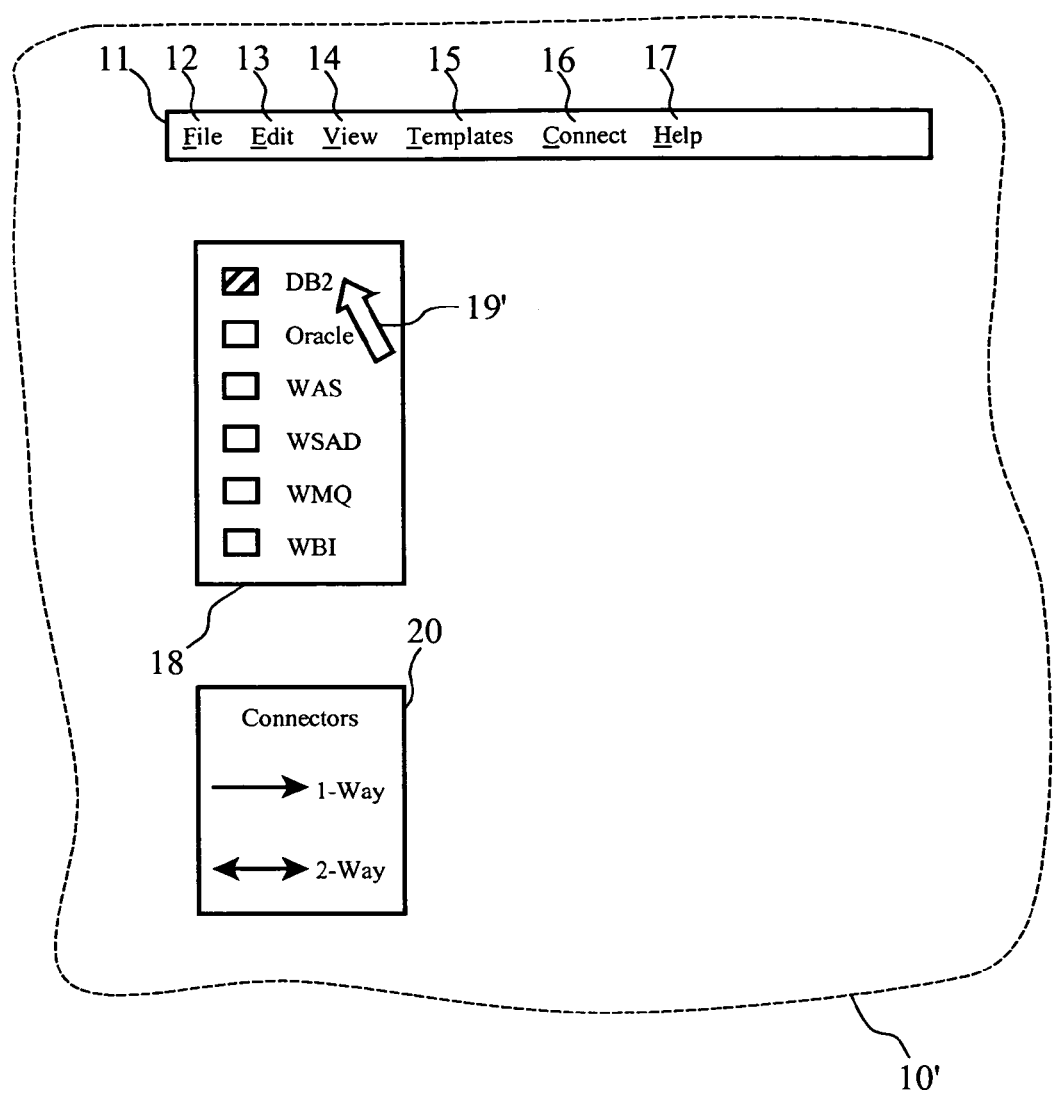
FIGS. 2a, 2b and 3 depict how the cursor is used to drag and drop solution components from the component palette to a design area.
Figure 2B:
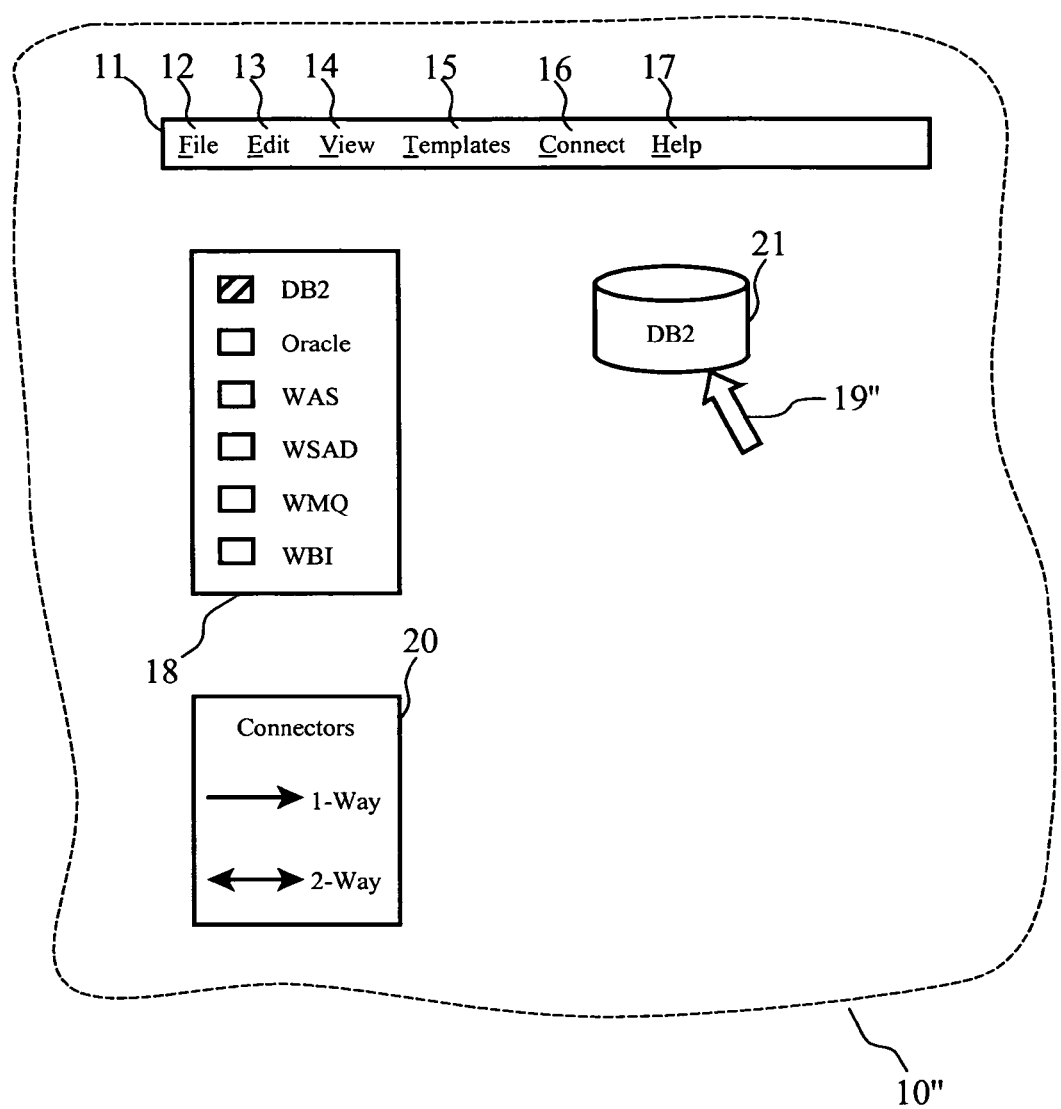

For example, FIGS. 2a and 2b show how the cursor is used to first select (19') a component in the palette, such as a DB2 database component, then drag it into the design area of the GUI, and dropping it (19") it to create a new instance of a DB2 database in the solution design.

Creation of Component Instances and Relationships

Figure 3:
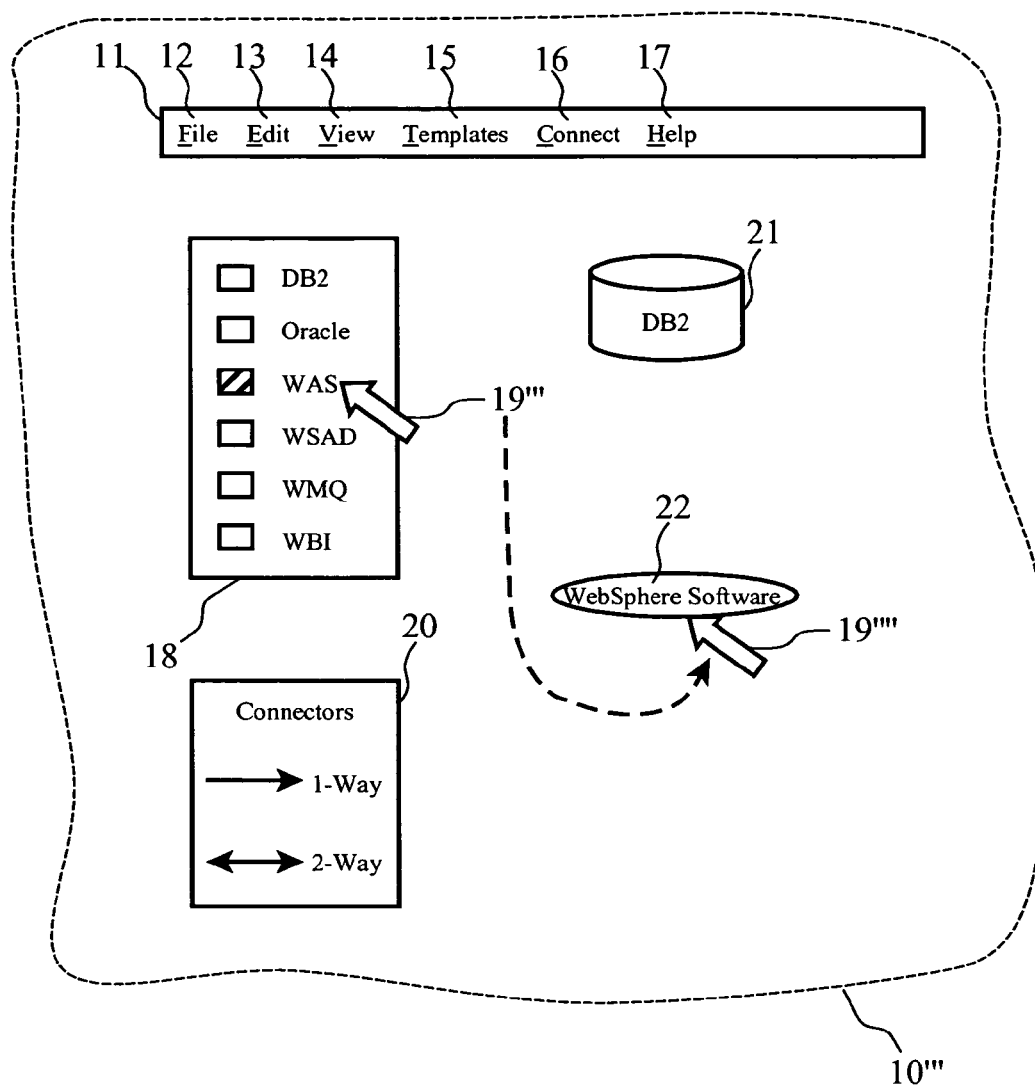

In FIG. 3, a subsequent drag and drop operation by the user has added a second component from the palette to the design area, in this example an instance of a WebSphere Application Server (22) ("WAS"). Now, the solution under design has two components—an instance of a DB2 database (21), and an instance of WAS (22).

Figure 4:
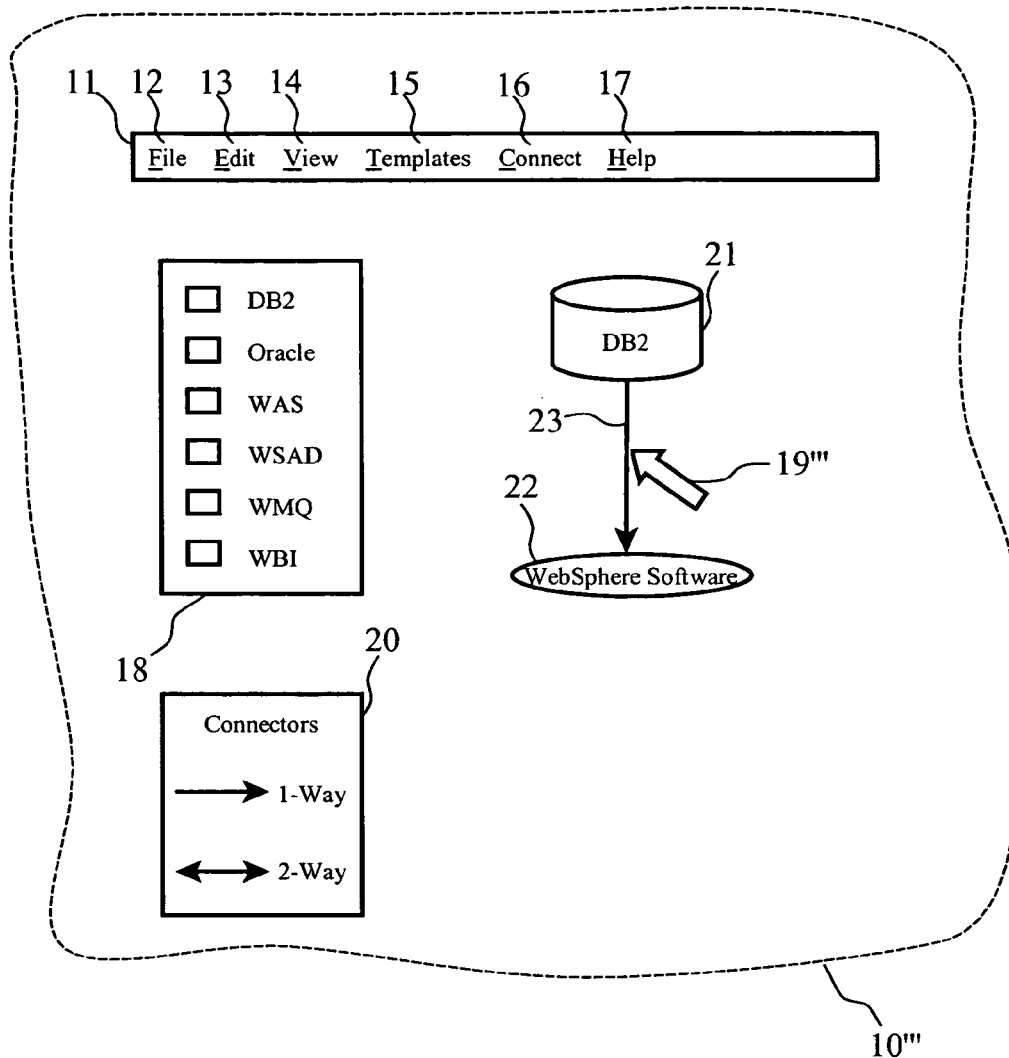
FIG. 4 illustrates how interfaced between components are defined.

At this point, the developer could continue to drag-and-drop components from the palette to the design area to create more instances of components in the design, or the developer can begin to define the relationships between the components already in the design. For example, by using the one-way or two-way connectors available in the GUI, FIG. 4 illustrates how components are interfaced to each other. The types of relationships available to the user is based on the predefined templates associated with each solution component. The cursor can be used to select a one-way data flow definition tool (single-headed arrow in the palette), for example, then it can be clicked once to define one end of the arrow icon (e.g. the input or output), say on the DB2 instance (21), and then clicked a second time on another component, such as the WAS (22) instance. This results in the graphical creation of an arrow (23) showing one-way data flow from the database component to the WAS component.

Figure 5:
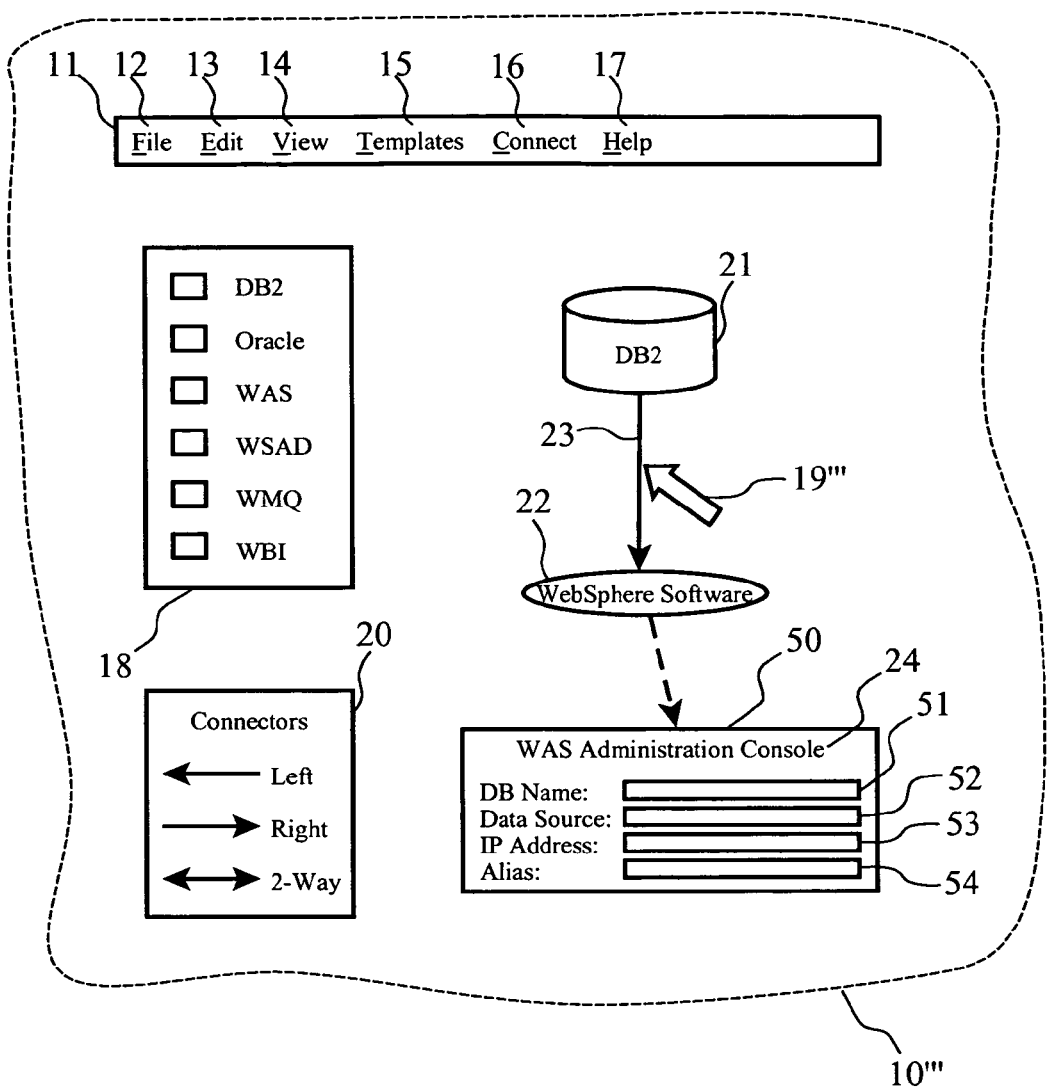
FIG. 5 shows an example user prompt for defining connection options and configuration parameters.

Once a relationship is established between two components, the intelligence logic of the invention automatically prompts the user for inputs to complete required fields that facilitate the integration process according to pre-defined options and configuration features, as defined by the XML templates. Continuing with our example and turning to FIG. 5, the user input prompt window (50) is automatically displayed by the invention's logic once a connection is completed. In this case, a WAS Administration Console is shown, requesting the user to input fields to define the interface between the WAS to the DB2, such as the database name (51), its source (52), the Internet Protocol ("IP") address (53), and an alias (54) that denotes the username and password.

Connection Intelligence Logic

Figure 6:
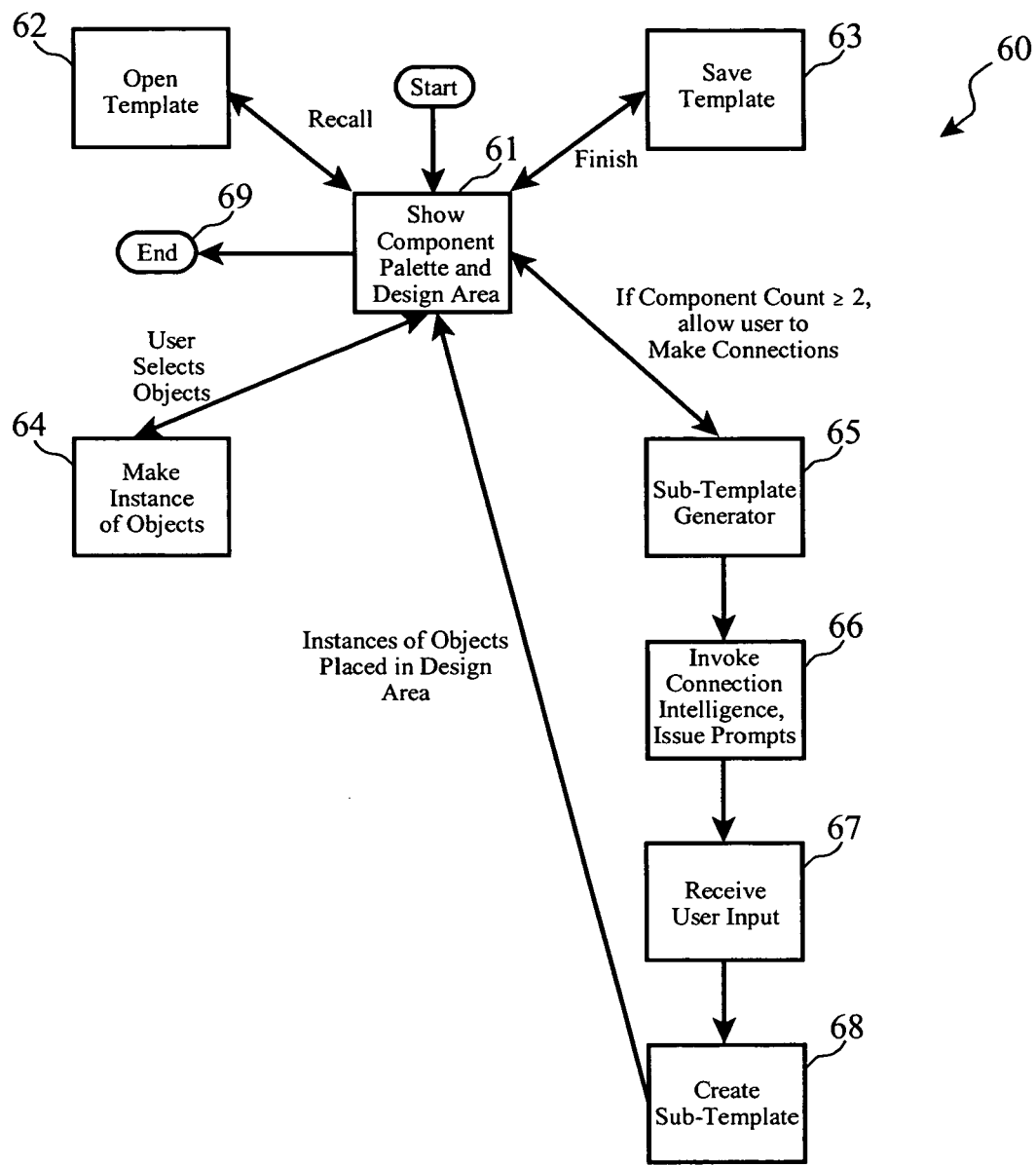
FIG. 6 illustrates a logical process for intelligent interface definition between components.

Turning to FIG. 6, a connection intelligence logical process (60) according to the invention is depicted. The GUI shows (61) a component palette and design area on the display of the developer's computer. The design area may be clear if starting a new design, or it can include components previously defined and saved (63). A "recall" (62) option allows the developer to open or import a previously saved solution design into the design area.

When each solution component in the palette is selected, dragged and dropped into the design area by the user, an object instance is created (64) in the design area. Multiple instances of the same type component can be created in this manner (e.g. multiple DB2 instances or multiple WAS instances).

Once at least two components have been added to the design area, the user can use the "make connection" option at any time. Each time a relationship between two or more components is established, a sub-template generator (65) is invoked. This displays an intelligence form (66) on the GUI to request user inputs for required and optional fields related to defining the interface between the components. When the inputs are received (67) from the user, the design area is updated to show the connection, and the sub-template is saved which defines the interface between the related components.

Figure 7:
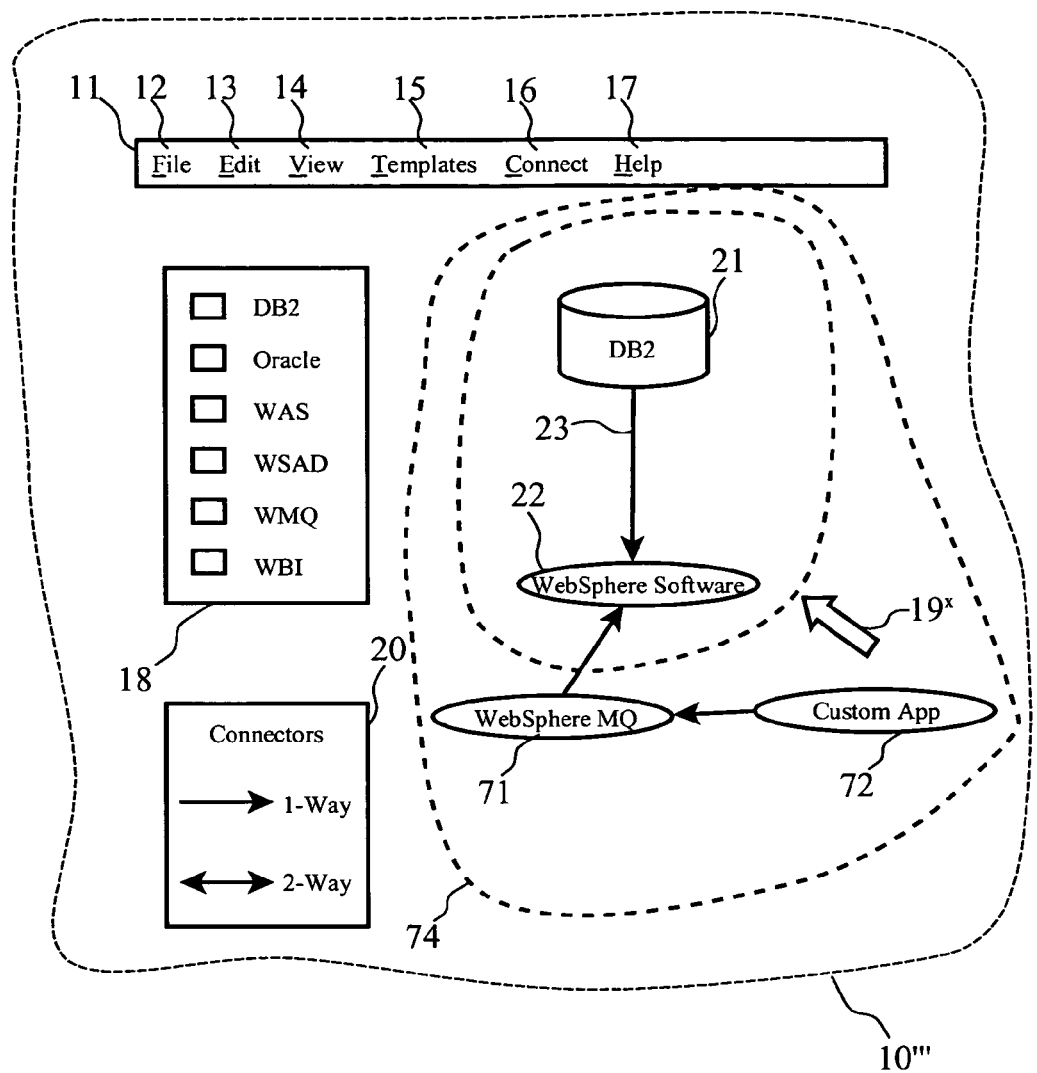
FIG. 7 shows the process in saving a partial sub-system using the GUI tool.

Turning to FIG. 7, the figures shows the process of saving a partial sub-system using the GUI tool (70). After a user has completed creating the component instances, such as adding to the previous example an instance of WMQ (71), and a custom application (72) (e.g. proprietary software, a web browser, etc.), and has defined the relationships of the components, the user can save the whole solution, or just partial sub-solutions for reuse.

For example, if the user wishes to save the entire solution including all of the component instances and their relationships, the user selects all of the components in a manner such as dragging a selection line (74) around all of the components. If the user only wishes to save a partial sub-system or sub-solution, one would select only those components for saving, such as drawing a selection line (73) around the DB2 and WAS components, followed by performing a "save" function. This capability of the invention enables users to quickly create, add, or modify existing solutions through use of individual components as well as reuse of previously defined partial solutions.

Solution Builder Wizard Advantages

Using these methods, the Solution Builder Wizard provides user the ability to quickly develop a cohesive solution using a GUI palette to create the necessary components and establish the desired logical relationships between each other. The ease in drag and drop eliminates the complexity in integration and simplifies the required input information without the user having to sort through tedious amounts of manuals and guidebooks in installation and deployment. This results in saving considerable time, resources, and expense using this preferred embodiment. Not only can the proof of concept be swiftly completed, but also the enormous amount of time that can be saved during the actual installation, test, and deployment phase.

Users now have the ability to see actual or close to real simulated environment before final development occurs. The GUI provides a one-stop shop for developers to create prototypes using a variety of application components and integrate them using the simplified process driven by the intelligence logic. By updating the templates on-the-fly in the GUI, productivity increases dramatically. The flexibility of using UML allows the solution to be defined in a written format that can easily be edited or modified if necessary in CVS file format.

Component Solution Templates

As mentioned earlier, the preferred embodiment includes UML models of each available solution component written in XML. FIG. 10 shows an example DB2 database model in UML.

To correctly interpret information contained in an XML file, a system must also have an associated Document Type Definition ("DTD") file, which is file defining and constraining the data or statements allowed in an XML file for a specific purpose.

FIG. 11 shows an Item Description DTD according to the preferred embodiment for the model of FIG. 10. FIGS. 12a and 12b show an example item description in XML for an MQ Series server component, also according to the example DTD of FIG. 11. FIGS. 13a-13g show an example item description in XML for a WAS component according to the example DTD of FIG. 11, as well.

Suitable Computing Platform

The invention is preferably realized as a feature or addition to the software already found present on well-known computing platforms such as personal computers, enterprise servers, and web servers. These common computing platforms can include properly configured personal computers, as well as portable computing platforms, such as personal digital assistants ("PDA"), web-enabled wireless telephones, and other types of personal information management ("PIM") devices, providing that they have suitable resources to support the software applications and logical processes as described in the foregoing paragraphs.

Therefore, it is useful to review a generalized architecture of a computing platform which may span the range of implementation, from a high-end web or enterprise server platform, to a personal computer, to a portable PDA or web-enabled wireless phone.

Figure 8:
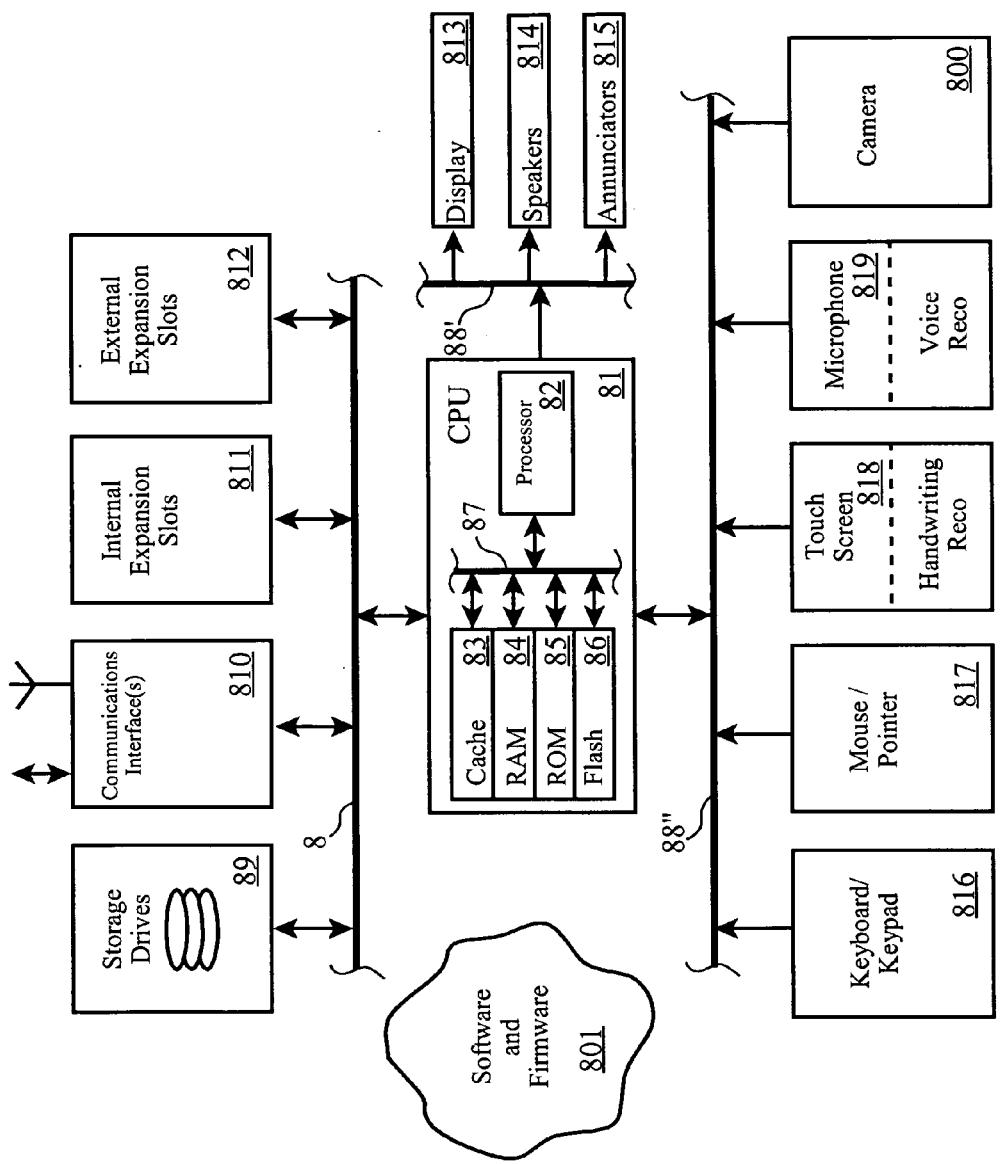
FIG. 8 depicts a generalized computing platform architecture, such as a personal computer, server computer, personal digital assistant, web-enabled wireless telephone, or other processor-based device.

Turning to FIG. 8, a generalized architecture is presented including a central processing unit (81) ("CPU"), which is typically comprised of a microprocessor (82) associated with random access memory ("RAM") (84) and read-only memory ("ROM") (85). Often, the CPU (81) is also provided with cache memory (83) and programmable FlashROM (86). The interface (87) between the microprocessor (82) and the various types of CPU memory is often referred to as a "local bus", but also may be a more generic or industry standard bus.

Many computing platforms are also provided with one or more storage drives (89), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (810), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (811), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (812) allowing the user the ability to easily install and remove hardware expansion devices, such as PCMCIA cards, SmartMedia cards, and various proprietary modules such as removable hard drives, CD drives, and floppy drives.

Often, the storage drives (89), communication interfaces (810), internal expansion slots (811) and external expansion slots (812) are interconnected with the CPU (81) via a standard or industry open bus architecture (88), such as ISA, EISA, or PCI. In many cases, the bus (88) may be of a proprietary design.

A computing platform is usually provided with one or more user input devices, such as a keyboard or a keypad (816), and mouse or pointer device (817), and/or a touch-screen display (818). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (819), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (800), such as a still digital camera or full motion video digital camera.

One or more user output devices, such as a display (813), are also provided with most computing platforms. The display (813) may take many forms, including a Cathode Ray Tube ("CRT"), a Thin Film Transistor ("TFT") array, or a simple set of light emitting diodes ("LED") or liquid crystal display ("LCD") indicators.

One or more speakers (814) and/or annunciators (815) are often associated with computing platforms, too. The speakers (814) may be used to reproduce audio and music, such as the speaker of a wireless telephone or the speakers of a personal computer. Annunciators (815) may take the form of simple beep emitters or buzzers, commonly found on certain devices such as PDAs and PIMs.

These user input and output devices may be directly interconnected (88', 88") to the CPU (81) via a proprietary bus structure and/or interfaces, or they may be interconnected through one or more industry open buses such as ISA, EISA, PCI, etc.

The computing platform is also provided with one or more software and firmware (801) programs to implement the desired functionality of the computing platforms.

Figure 9:
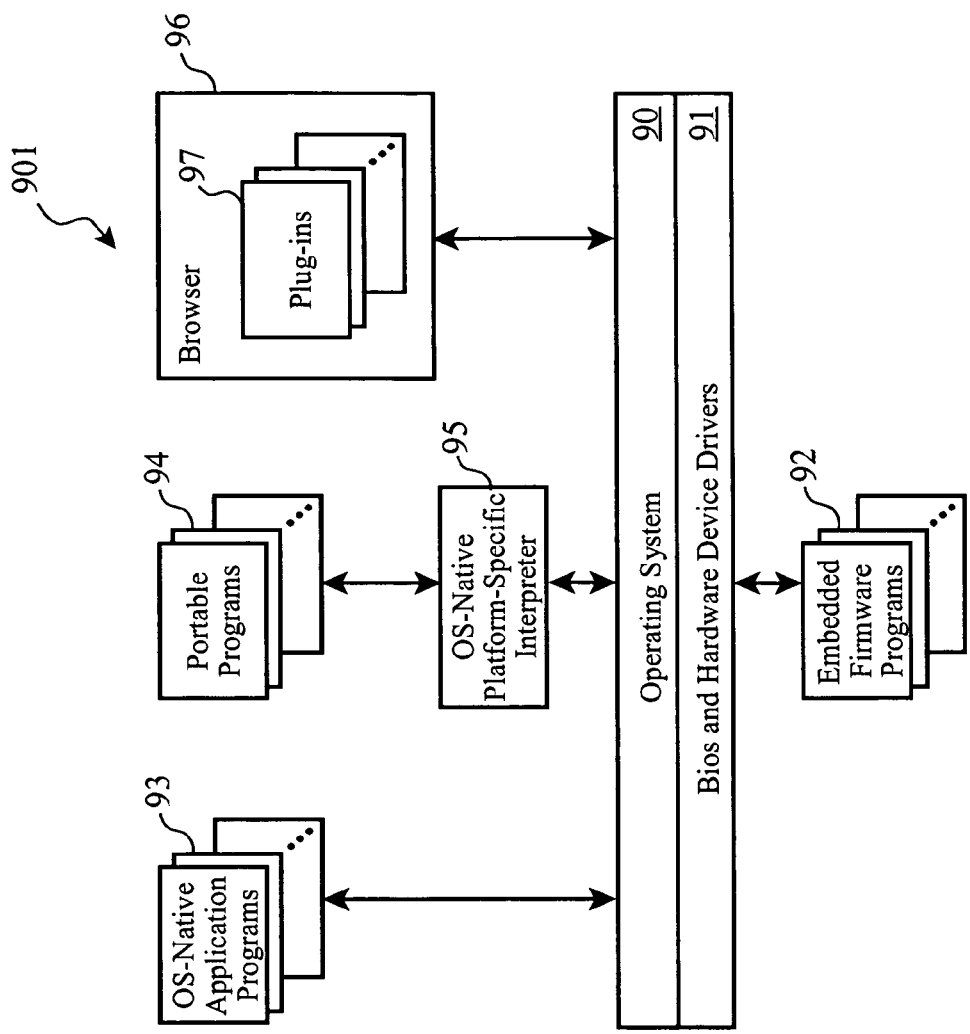
FIG. 9 shows a generalized organization of software and firmware associated with the generalized architecture of FIG. 8.

Turning to now FIG. 9, more detail is given of a generalized organization of software and firmware (801) on this range of computing platforms. One or more operating system ("OS") native application programs (93) may be provided on the computing platform, such as word processors, spreadsheets, contact management utilities, address book, calendar, email client, presentation, financial and bookkeeping programs.

Additionally, one or more "portable" or device-independent programs (94) may be provided, which must be interpreted by an OS-native platform-specific interpreter (95), such as Java™ programs.

Often, computing platforms are also provided with a form of web browser or micro-browser (96), which may also include one or more extensions to the browser such as browser plug-ins (97).

The computing device is often provided with an operating system (90), such as Microsoft Windows™, UNIX, IBM AIX™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (91) are often provided to allow the operating system (90) and programs to interface to and control the specific hardware functions provided with the computing platform.

Additionally, one or more embedded firmware programs (92) are commonly provided with many computing platforms, which are executed by onboard or "embedded" microprocessors as part of the peripheral device, such as a micro controller or a hard drive, a communication processor, network interface card, or sound or graphics card.

As such, FIGS. 8 and 9 describe in a general sense the various hardware components, software and firmware programs of a wide variety of computing platforms, including but not limited to personal computers, enterprise servers, web servers, PDAs, PIMs, web-enabled telephones, and other appliances such as WebTV™ units. It will be readily recognized by those skilled in the art that the methods and processes of the present invention may be alternatively realized as hardware functions, in part or in whole, without departing from the spirit and scope of the invention.

Intelligence Properties File and Deployment Descriptors

The present invention utilizes "Intelligence Properties Files" model to simplify the installation and configuration process for each component in the final solution design. Using deployment properties files which are based on experience of the user or installer, the need for specialists for each component is reduced or eliminated during installation.

Each time the solution developer specifies or creates a "connection" between two components in the design area, logic of the invention is invoked to determine the needed configuration and option parameters to interface the selected components to each other, as previously disclosed.

This logic provides a "pop-up" dialogue to the solution developer to prompt the user for selections and input based on its properties files. The input information is then used by the logic to configure the two components to interact with each other within the pre-defined constraints and conditions of the logic, thereby relieving a user of the necessity of an expert in the configuration and installation for either of the solution components.

When a connection between two or more components is made or defined, the invention automatically recognizes the need for customization information for this type of connection, and prompts the developer to enter the required configuration data necessary to make the connection valid and functional, such as user id and password, data source, network address, encryption options, etc. This information is then saved to configuration files which can later be used during actual installation of the system components into the solution.

Each component of the system solution has its own associated installation and configuration properties file, as well. Each individual properties file enables the semi-automated installation and configuration of prototypes, as well as driving the creation of deployment descriptors for the eventual solution deployment. According to one available embodiment based upon an IBM Websphere Application Server, each deployment descriptor contains configuration data that the run-time environment uses for an application program or system solution component. A deployment descriptor can include information about the following:

(a) the structure and content (enterprise beans or servlets, for example) of the application;

(b) references to internal and external dependencies of the application (e.g. an enterprise bean in an EJB module can require another enterprise bean that is not bundled in the same module);

(c) references to resource factory objects, such as URLs, JDBC DataSources, JavaMail Sessions, JMS Connection Factories, JMS Destinations, and J2C Connection Factories;

(d) security roles that the container uses when implementing the required access control for the application; and (e) transactional information about how (and whether) the container is to manage transactions for the application.

Typically, deployment descriptors are XML files packaged with the application's files in a Java archive file. For example, a typical Java Version 2 Enterprise Edition ("J2EE") application contains one application-level deployment descriptor file controlling the application as a whole, but may also contain several component-level deployment descriptors, one for each module in the application.

Deployment descriptors often include information on bindings and platform-specific extensions. Binding information maps a logical name of an external dependency or resource to an actual JNDI name. For example, the container uses binding information to locate a remote bean at installation. Platform-specific extensions, such as IBM WAS extensions, are additions to the standard descriptors for J2EE applications, Web applications, and enterprise beans.

Through this function of the present invention, users are allowed to build a blueprint for the solution components with its associated properties files to be used during configuration. According to one aspect of the preferred embodiment, users have options to customize properties file based on their own abilities to configure a product: (a) simple, (b) advanced, or (c) automatic. The simple option permits users to input basic configuration parameters, while the advanced option allows users to highly customize its setup such as enhancing functionality or performance. The automatic option encompasses the most commonly used installation configuration options and parameters.

As such, our new "Intelligence Properties Files" model, simplifies the installation and configuration process by using properties file that will allow configuration input based on experience. By using a GUI, a set of predefined "templates" for each component, and implementation intelligence logic, enables speedy assembly of various solution components together into one cohesive solution.

Figure 14:
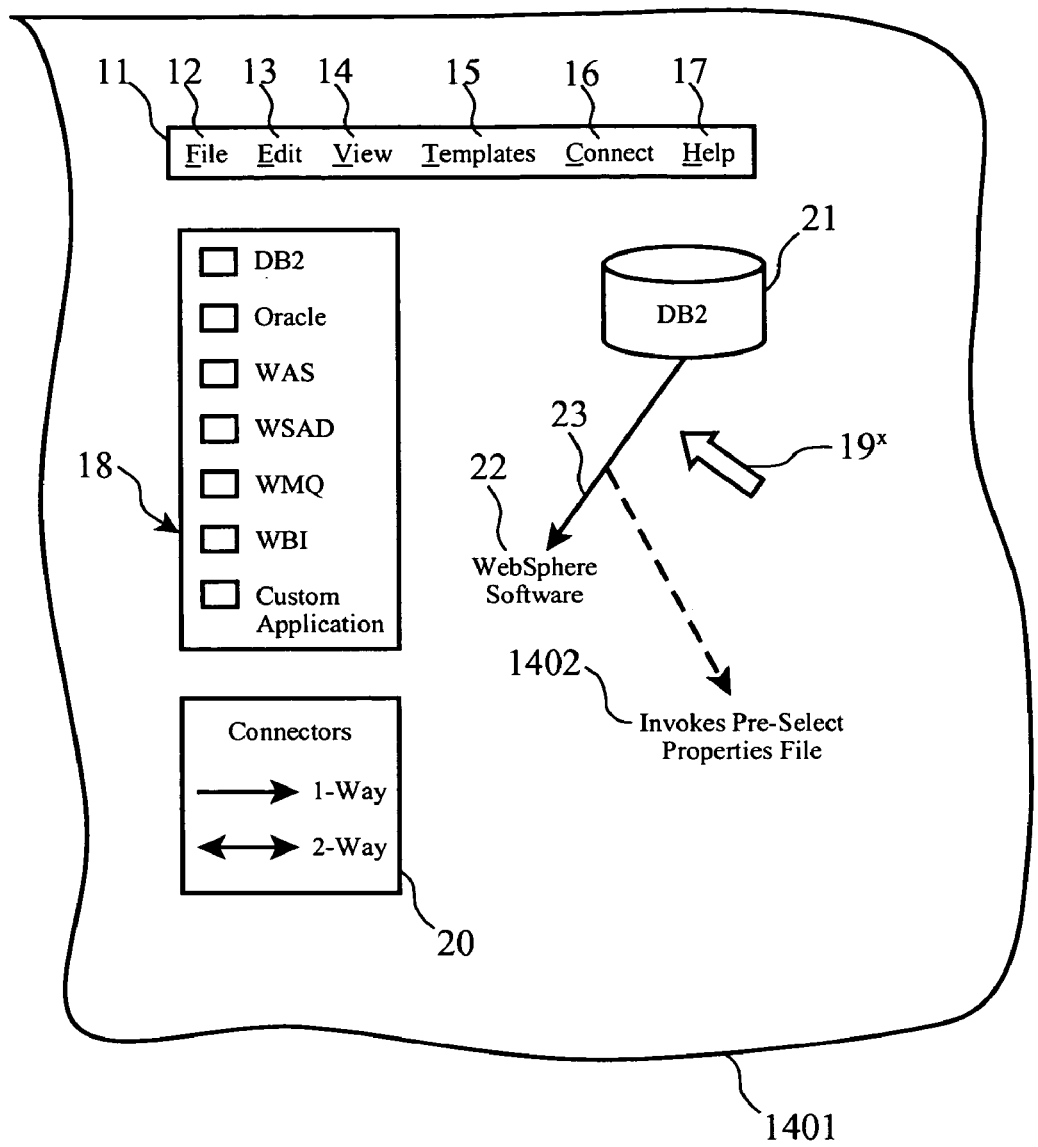
FIG. 14 shows the pre-selected properties file being invoked when relationships between solution components are established.

Turning to FIG. 14, the user interface according to the present invention is illustrated, showing how definitions of interfaces between components are configured or created (1401). When a relationship is established (1402) between two or more components by the user, the intelligence logic of the invention automatically prompts the user for inputs to complete required fields, potentially optional fields, that facilitate the integration process according to pre-defined options and configuration features, as defined by the XML templates. Based on the user's level of configuration complexity selection, the appropriate properties files are pre-loaded into the Solution Wizard Tool.

Figure 15:
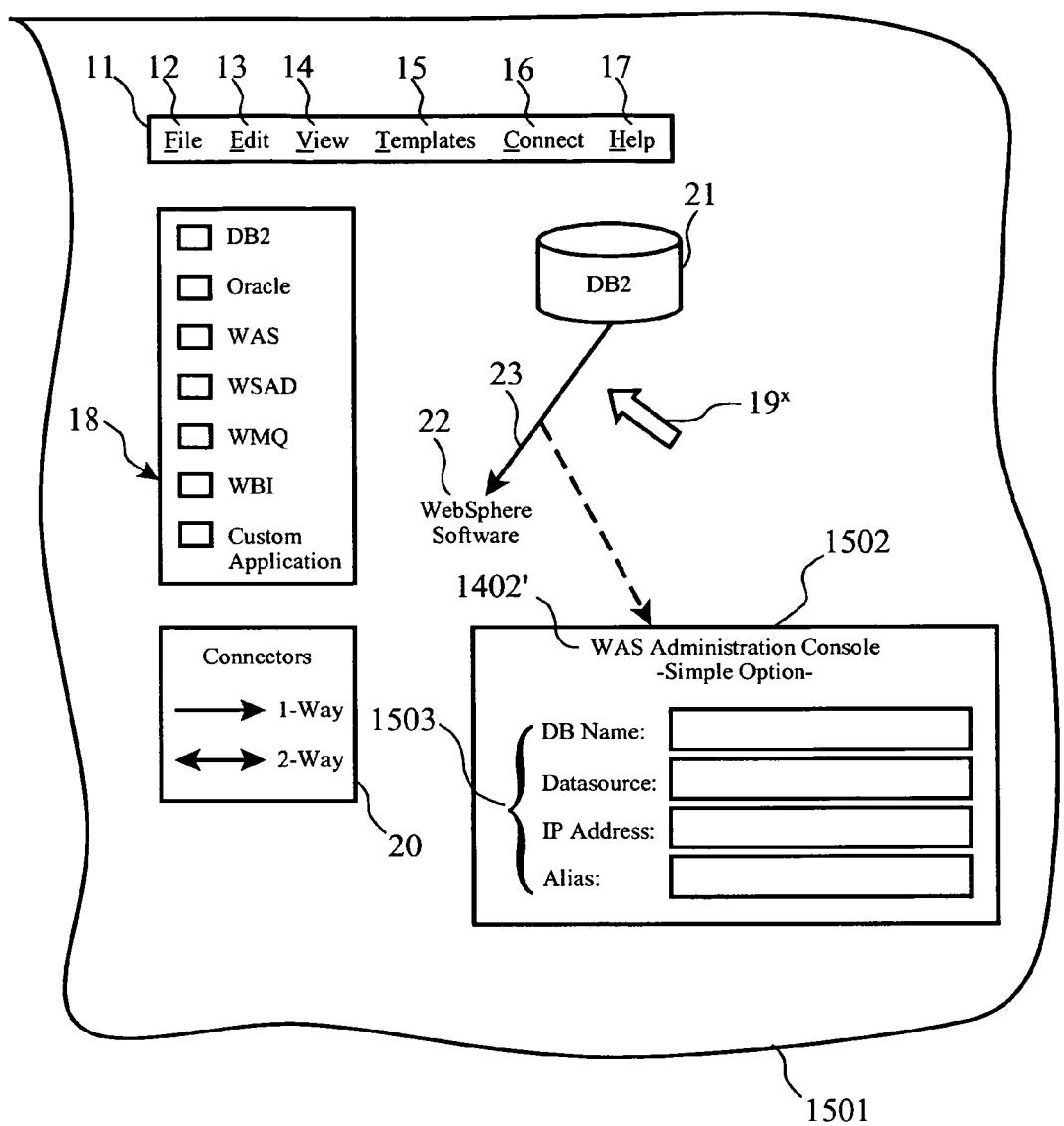
FIG. 15 illustrates pre-selected properties file using the customized simple option.

Simple Configuration Option. Continuing with our example and turning to FIG. 15, a user input prompt window (1502) is automatically displayed (1501) by the invention's logic once a connection is completed by the user. In this example, a WAS Administration Console Simple Option (1402') is shown, requesting the user to input fields (1503) to define the interface between the DB2 database instance to the WAS instance, such as the database name, its source, the Internet Protocol ("IP") address, and an alias that denotes the username and password. The simple option encompasses the most commonly required information that users will input in order to successfully perform basic configuration.

Figure 16:
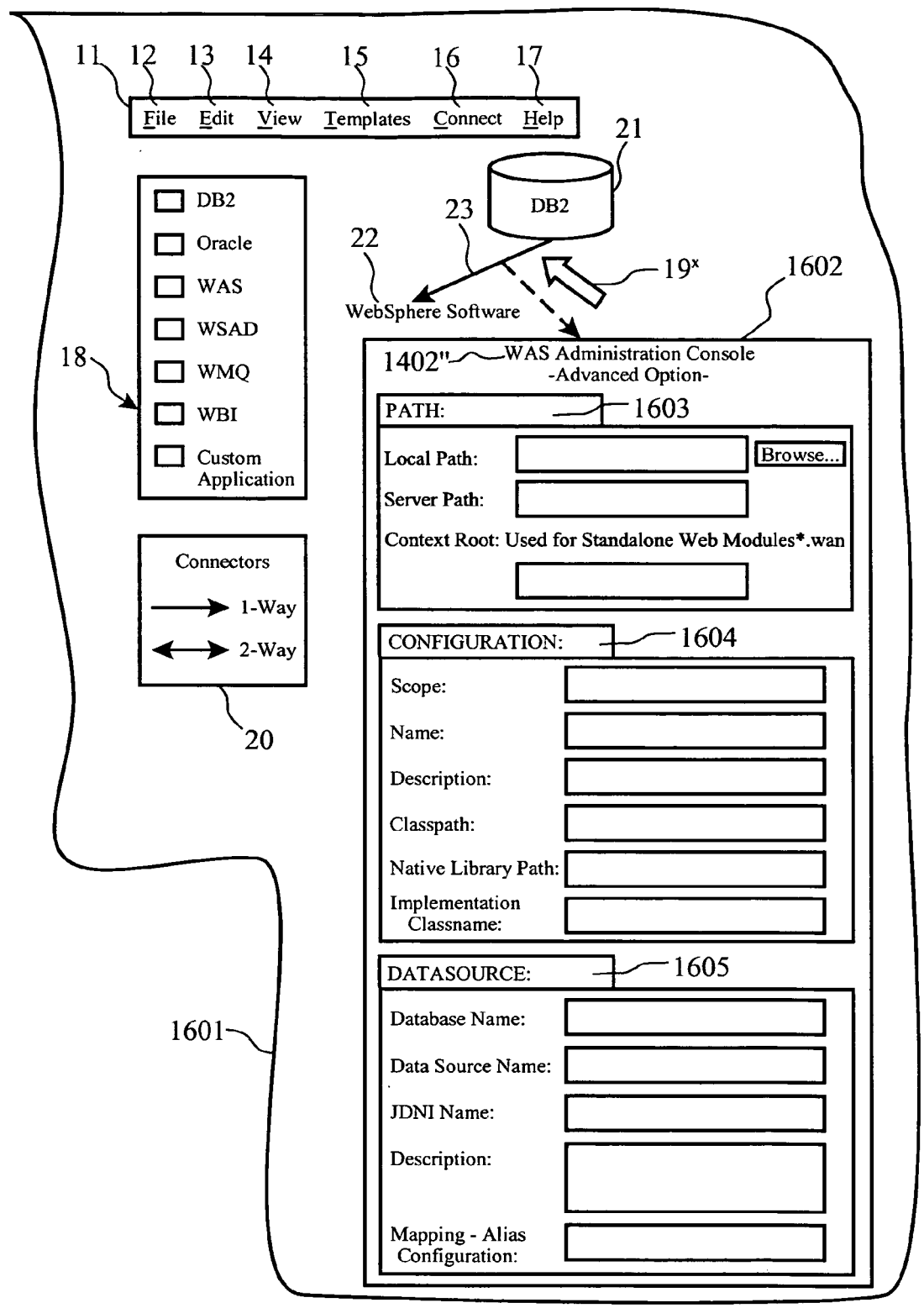
FIG. 16 shows pre-selected properties file using the customized advanced option.

Advanced Configuration Option. When in-depth installation or configuration is needed, specialized experts are usually required to facilitate the deployment process for each solution component, without the benefit of the present invention. However, by using the present invention, the Intelligence Properties Files enables non-specialists to quickly input desired data into a detailed user prompt window (1601) shown in FIG. 16. In this scenario (1602), the WAS Administration Console Advanced Option (1402") is shown, requesting the user to input fields to define the interface between the WAS to the DB2, preferably using an organized tab display structure. A first tab (1603) in this example allows definition regarding the WAS path, its configuration, and datasource details. The path consists of the actual location of the solution component file such as the file path, server path, and context root.

The configuration tab (1604) allows input from the user of scope, name, description, classpath, native library path, and implementation classname, which is the Java classname of the JDBC driver for the specific implementation.

The datasource section (1605) allows user definition of the database name, datasource name, Java Naming Directory Interface ("JNDI") name, description, and the mapping configuration alias such as username and password. The advanced option consists of particular information users will input in order to successfully perform a highly specialized configuration.

Figure 17:
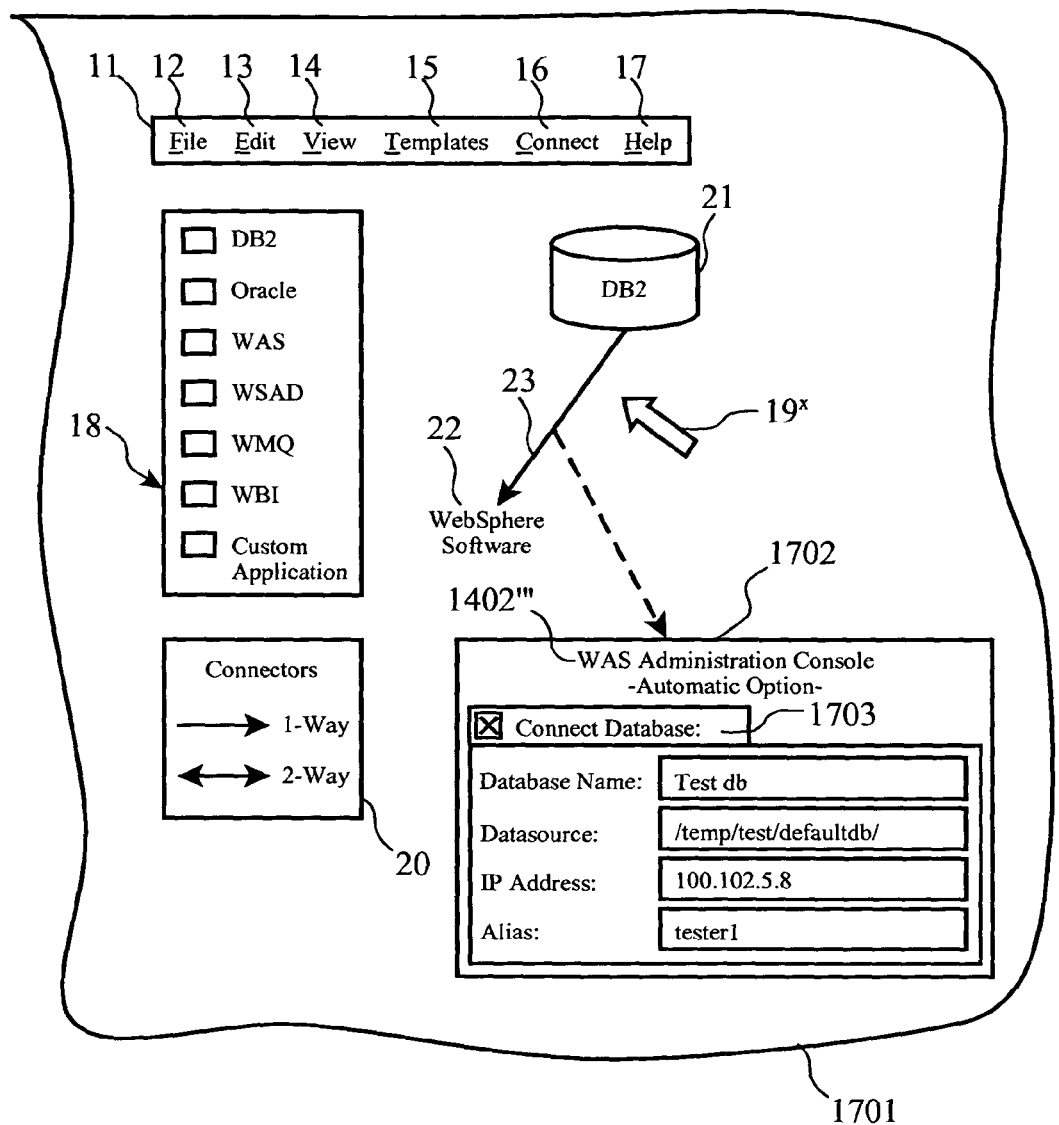
FIG. 17 illustrates pre-selected properties file using customized automatically pre-fills the required parameters for automatic configuration.

Automatic Configuration Option. On the other hand, because of project constraints such as time, expenses, or resources, users may elect to choose the automatic option to quickly create a proof of concept or blueprint to use during installation and deployment phase. Turning to FIG. 17, the diagram illustrates the automatic properties files option (1701). When the relationship between the DB2 and WAS is established, the automatic option (1702) is invoked. The user prompt window displays the minimal required parameters (1402''') to connect to the desired database (1703) with its default or predefined inputs pre-filled into each criterion: database name, its datasource, the IP address, and an alias. Not only does this enable the user to build solutions quickly using the intelligence properties files, but also eliminates the risk of human errors which can hinder integration.

Figure 18:
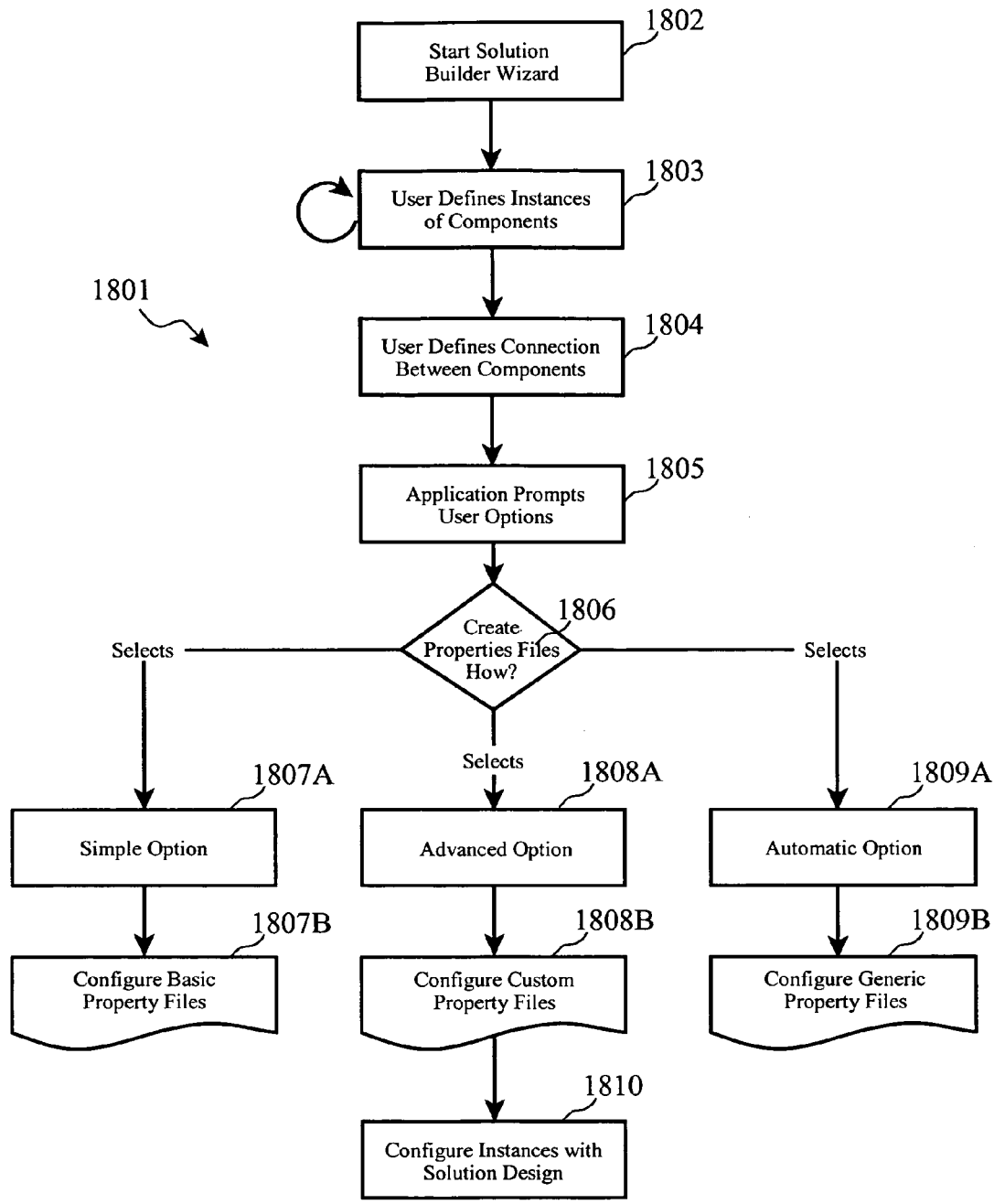
FIG. 18 depicts the logical process to select custom configuration method in relation to intelligence properties files.

Configuration Intelligence Logic. Turning now to FIG. 18, the configuration intelligence logical process (1801) of the invention is depicted. The process starts (1802) by user initiation of the Solution Builder Wizard application. The user then defines (1803) instances of system components in the design area, as previously described. When the user defines (1804) a connection between two or more components, the Wizard prompts (1805) the user to make a decision on the level of configuration to be used during prototyping and/or during final deployment: the simple, advanced, or the automatic method.

Based on the user's selection (1806), the user is further prompted for information and input in order to complete the configuration of the properties files. The simple option will allow for the customer to input basic configuration parameters (1807A), while the advanced option (1808A) will permit users who are highly capable or specialized to enhance functional performances. The automatic option (1809A) will take the most commonly used installation and deploy the solution components using those defaults within an application. Once a selection is made, instances of the related properties files for the chosen alternative created, configured and stored in association with the solution being designed (1807B, 1808B, 1809B). The user is then allowed to continue defining instances of system components (1803), and definition of interfaces and configurations (1801).

Properties Files Advantages. Using these methods, the Intelligence Properties Files of the invention provide a system solution designer the ability to quickly develop a cohesive solution using a GUI palette to create the necessary components and establish the desired logical relationships between each other. The ease in configuration eliminates the complexity in integration and simplifies the required input information without the user having to sort through tedious amounts of manuals and guidebooks in installation and deployment. This results in massive amount of time, resource, and expense saved using this preferred embodiment. Not only can the proof of concept be swiftly completed, but also the enormous amount of time that can be saved during the actual installation, test, and deployment phase.

Users now have the ability to see actual or close to real simulated environment before actual development occurs. By using the properties files, developers can integrate various solution components using a basic process driven by intelligence logic based on experiences. With this method, level of difficulty or detail in configuration can correspond to an user's aptitude and knowledge without negatively impacting the overall configuration process.

Prototype Simulation and Testing using Customer Data

Testing a cohesive solution composed of several different types of applications can be very confusing and intricate. In fact, often it requires a massive amount of hardware and software to be pre-installed and integrated before a custom application solution can be tested. For this reason, many new solutions or prototype solutions are often tested in a "live" or "production" environment, which can pose serious problems and risks to the actual business solutions which are being used by actual customers.

By providing a simulated test environment on the prototype solution according to the present invention, much of the complexity and risk in integration can be avoided or even eliminated. Further, customers are allowed to preview how the prototyped solution will actually operate under a similar environment, without requiring use or risk to a live or production solution.

Figure 19:
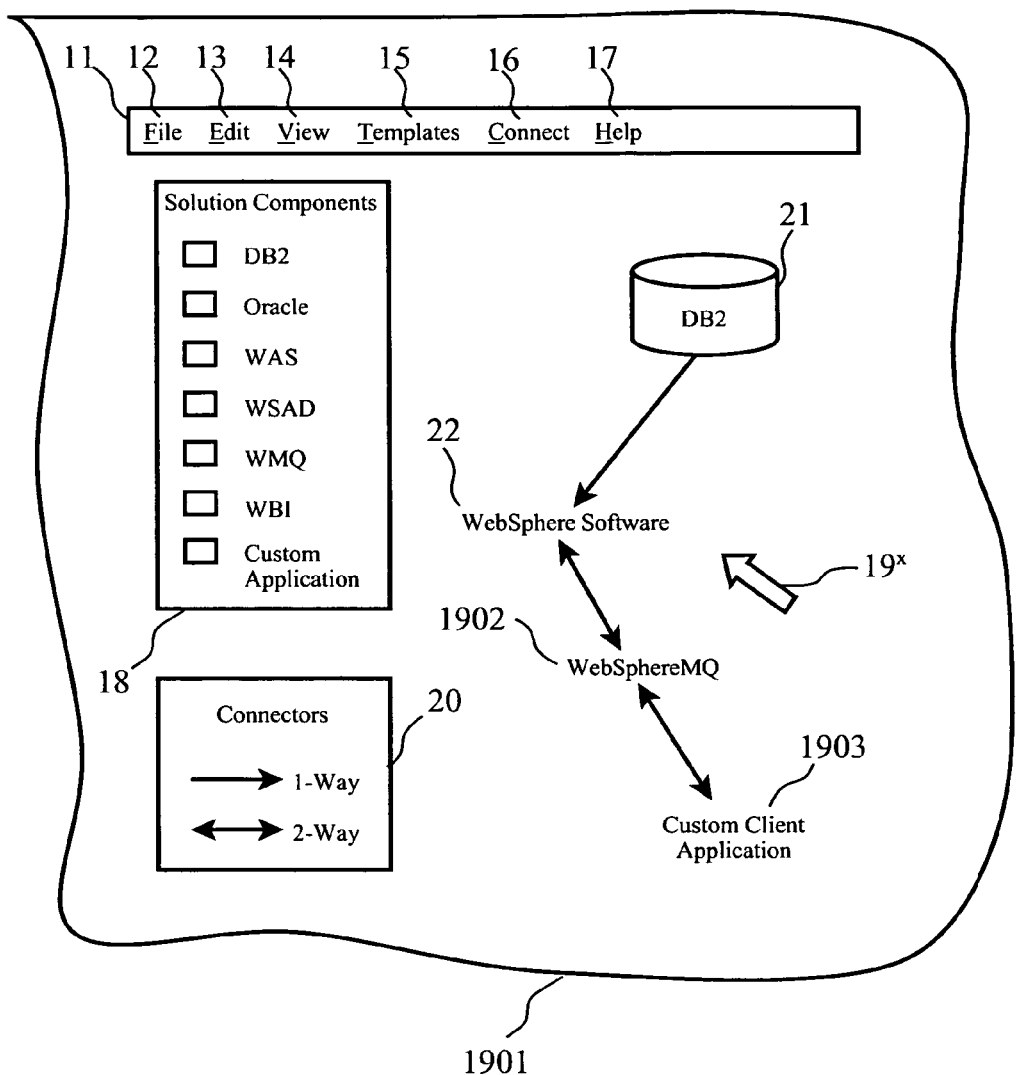
FIG. 19 illustrates selection of solution components for subsequent testing and simulation using actual customer data.

Turning to FIG. 19, the diagram illustrates a portion of GUI (1901) in which a user has selected the required solution components and established its respective relationships. The user has decided in this example to add an instance of the IBM WebSphereMQ product (1902) connected to a custom client application (1903) to the existing WAS (22) and a database (21) instances in the design area of the Solution Builder Wizard GUI.

By way of background and for greater understandability to the reader, we now diverge temporarily to provide more details on the well-known IBM WebSphere MQ messaging capabilities and mechanisms which is utilized in one available embodiment of the present invention. WebSphere MQ™ messaging products enable application integration by allowing business applications to exchange information between each other within the same computing platform, as well as across different platforms, by sending and receiving data as messages according to a published format by IBM. This messaging system is available for many platforms and operating systems, including Linux for Intel™-based platforms as well as IBM zSeries, iSeries and Microsoft Windows XP based platforms. MQ messaging allows programmers to focus on functionality of their system component, leaving details of interoperability and intercommunication to be handled by MQ. MQ utilizes Secure Sockets Layer ("SSL") network-based communications protocols, and supports Java™ Message Server ("JMS") for compatibility with many existing solution products. It will be recognized that use of other messaging services in place of IBM's MQ service is within the scope of the present invention, and that use of the MQ product as described herein represents just one of several embodiment options of the invention.

Figure 20:
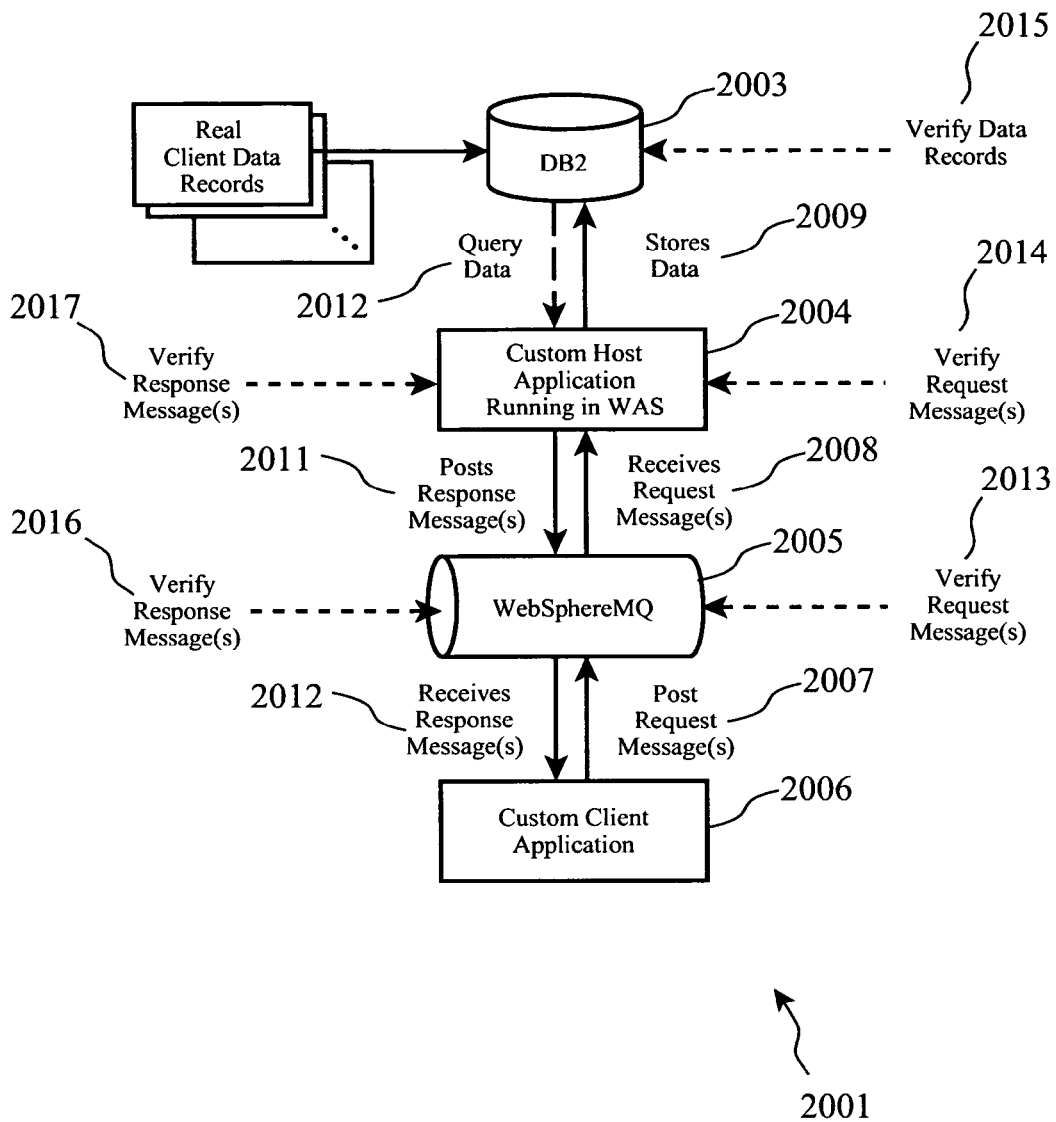
FIG. 20 depicts logical process according to the present invention of an automated real time testing of a prototyped solution in a Solution Builder Wizard environment using actual customer data.

A logical process and system diagram (2001) according to the present invention is shown in FIG. 20. Once the user has used the Solution Builder Wizard to design the prototyped solution (or portion of a solution), a subset of a real customer data (2002) is uploaded into the database (2003). Within the simulated test environment of the Solution Builder Wizard, various types of test scripts are initiated to perform and validate each test case. According to one aspect of the present invention, the behavioral models which are configured for each instance of each component in the system under design communicate with each other using a message-based scheme, such as the aforementioned WebSphere MQ messaging system or an equivalent.

During simulation and/or testing, the custom client application (2006) first posts a request message (2007) to the WebSphereMQ (2005). A test validation can verify at this stage whether or not request message was received (2013). The WebSphereMQ service passes that message to the custom host application that is running in WAS (2004), which receives the request message (2008). The user can optionally confirm that the request message is received (2014), as previously described in conjunction with the console.

The host application (2004) processes the request(s), and stores the data (2009) into the database (2003), for example. Verification can be performed on the database to ensure new data records are added or existing records have been modified or updated (2015).

In one alternative to the protyped solution, the custom host application may not necessarily require any data from the database. However, if records are needed, then the database will send the query data (2010) back to the custom host application for processing. Again, a listener may be used to validate that the response message is processed (2017).

Once completed, then a response message will be posted back (2011) to the WebSphereMQ. A subsequent check can confirm that the response message is received (2016) by the solution component. The WebSphereMQ will listen for any messages then pass it back to the custom client application where it will receive the response message (2012). In this example, it shows that the user can utilize five checkpoints to verify proper messagings are being passed between solution components and whether or not its results are successful. Any errors within these five checkpoints will alert its tester that the prototyped solution is experiencing integration problems.

It will be appreciated by those skilled in the art, however, that many testing alternatives or methods may be used depending on an user's initial setup within the GUI palette and the invention is not limited to these specific embodiments. All solution components can communicate via messaging with one another, therefore, the simulated test environment can check to ensure that one object will respond correctly with another object. In addition, testing data and parameters may be defined to meet customer expectations and real customer data can be used to provide a close to exact look on how the proposed prototyped solution will actually work. This allows the customer the ability to review a proof of concept from a comprehensive perspective—not only from development view point, but also the final end product itself with real applicable data records.

Problem Determination Process

Once simulation is completed, the challenging task of problem determination in prototyped solution arises, also known as "debugging" the system solution. Very rarely do initial designs of complex systems operate completely as specified and expected, and almost always, some anomalies in operation or function are observed. Determining the source of the problem(s) is first required, followed by developing potential "fixes" or "solutions" to the problems, which is then followed by retesting or verification testing and simulation.

Using the present invention, the user or system designer has the ability to debug a system solution based on its data flows during the simulation process. As the simulations are carried out using a message-based infrastructure interconnecting the many system components which are represented using behavioral models, debugging of the system level design is enabled by the invention's ability to probe, tap, or trace communications between components throughout simulation, to capture the exchanged messages, and to add tracking information to aid in problem determination.

Figure 21:
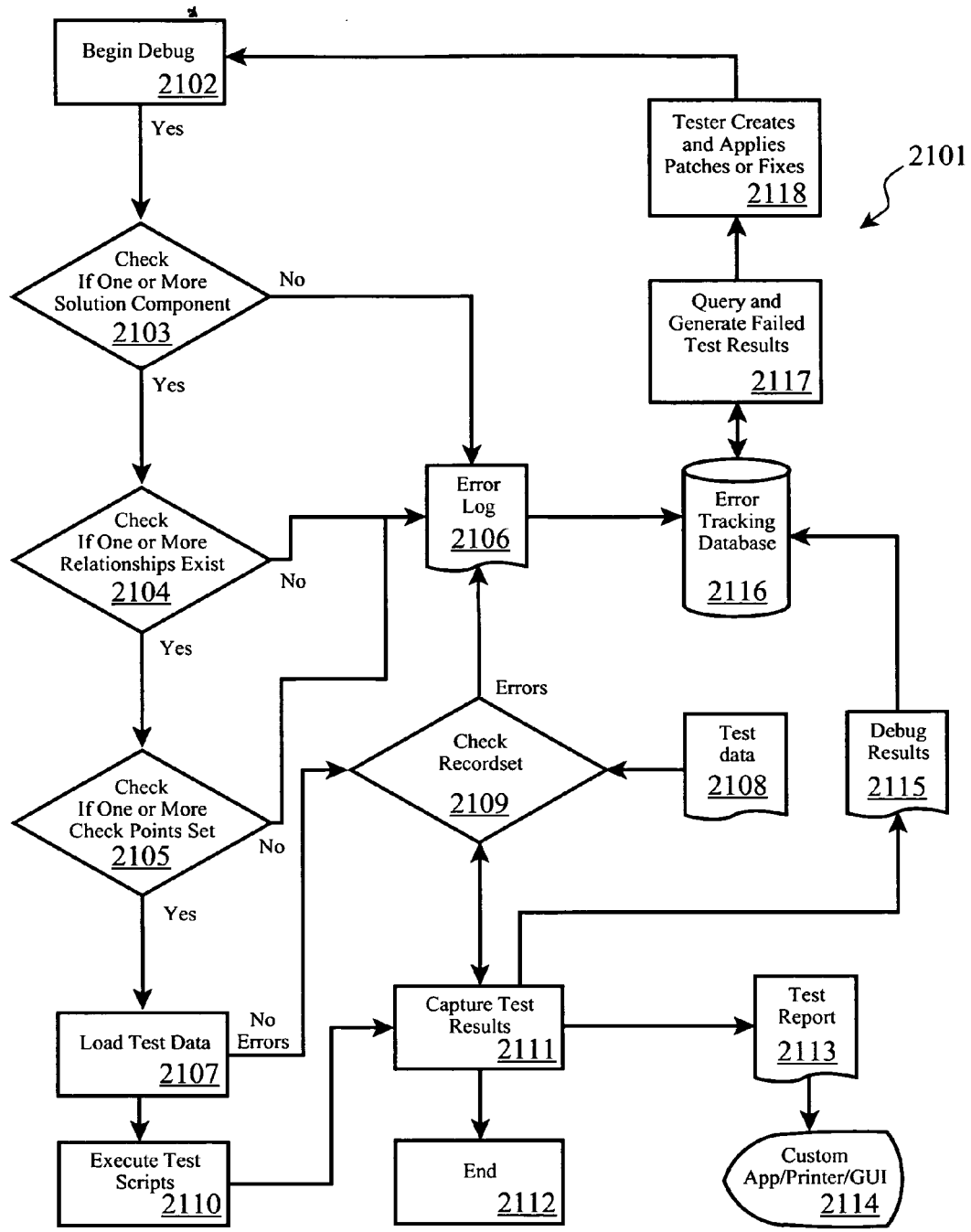
FIG. 21 sets forth a logical process for debugging a prototyped solution as performed by the present invention.

Turning to FIG. 21, the diagram shows the logical debugging procedure (2101). The user initiates the process (2102) and then it checks (2103) to see whether or not at least one or more solution component exists in the design area of the GUI. If not, then an error log entry is created (2106), otherwise it checks to ensure at least one or more relationships between solution components are established (2104) in the prototyped system design. This is to verify that integration between solution components has been defined in the prototyped solution, which allows appropriate data flow to occur. If no relationships exist, then a record is made to the error log (2106).

Afterwards, the system will verify that one or more testing check points are defined and set (2105). These are points in the system design where the designer wishes to capture or trace communications between components, such as the verification points (2017, 2014, 2016, etc.) shown in FIG. 20. As the infrastructure of the Solution Builder Wizard is message based (e.g. the components interface to each other using messaging protocols), these taps or probes into the communications are realized by capturing time-stamped copies of messages between components.

When all three validations are completed, the system loads the test data (2107), which can consist of a subset of real customer information, simulation data, manually created recordsets, or even randomly generated system data, as previously described. Before test data is loaded into the debug process, it first is preferably checked (2109) to ensure its own data integrity. If a problem with the test data is found, then a record is logged into the error log before data can be loaded for further testing and debugging. All error logs are then stored in the overall error tracking database (2116).

Once the test data is validated, test scripts or test cases are executed (2110) through the process of simulation, as previously discussed. When simulation is completed, the system captures test results (2111) in the form of captured time-stamped messages between components, and other tracking information (e.g. originator, destination, session ID, addresses, routing information, etc.).

The user is then allowed three options: (a) to end the debug process (2112), (b) to create a test report (2113) that can be displayed through a custom application, GUI, or be sent to a printer (2114), or (c) to create a debug error log (2115) that feeds into the error tracking database (2116).

Once simulation is completed, the user have the ability to query and generate failed test results (2117) from the error tracking database. This provides a list on the overall errors that have occurred during one test run where proper data flow did not occur, and provides copies of the messages which were captured during the simulation. The designer can create and apply patches or fixes (2118) that resolve these issues, followed by repeating the simulation and message capture process.

It should be noted that using the present invention, the debug process differs from traditional debugging procedure because it does not occur solely in development nor production environment. The user is not just troubleshooting one module and previewing written codes line by line, but rather resolving the whole prototyped solution which is composed of one or more solution components with its relationships and associated properties files.

Furthermore, the user is not restricted to create a staging environment which normally requires enormous amount of human and IT resources to test before sending into production environment. In fact, the prototyped solution can be tested and debugged quickly without impacting current real, "live" transactions and processes running in production.

Automatic Software License Package Generation

When there are multiple solution component types involved in any custom application, the legality of its related licensing agreements typically must be addressed as well. An End User License Agreement ("EULA") is basically a legal contract between the users who seek the right to use the application, and an author or publisher who grants the rights of usage. The license fees associated with EULA are usually negotiated between the parties involved and the agreements, and can be in various forms tailored to each specific situation.

For example, a particular solutions provider ABC Corp. may create computing solutions which often use a database from DEF Corp. ABC may negotiate, in advance, an ability to copy and deploy the DEF database product in solutions that ABC provides to its clientele, provided certain conditions are met.

Typically, these types of package or volume licensing arrangements include a set number of licenses, such as 1000 installations within 24 months, as a set price per installation, etc. These types of agreements also typically include reporting a registration requirements, whereby ABC Corp. is required to report each installed copy of the DEF database to DEF Corp., for both support purposes and for financial tracking purposes (e.g. invoicing against the volume licensing agreement).

Thus, it is often a requirement for solutions providers to determine which licenses for which components must be generated and registered before or concurrent with delivery of the solution to an client. This is often performed manually, by auditing the list of components and number of instances of each component type utilized in a final solution. This manual process can also become more tedious when licensing of components also depends on the features selected with each component.

There are a number of tools available on the market which assist corporations in managing their collective licenses from a viewpoint of asset management and control. Products such as IBM Tivoli License Manager ("TLM") allow corporations to track their total inventory of each type of license (e.g. operating systems, application programs, etc.) throughout the enterprise, and to "recover" licenses from systems which are removed from service (e.g. old workstations which are retired from use), re-allocate licenses from systems which no longer use certain software assets to systems which need those software assets, and other typical asset management functions, albeit applied to software licenses. Using tools such as these, IT personnel can:

(a) generate significant cost savings by automating the manual process of data collection needed continually for budget planning, contract negotiations and renewals;
(b) assist in verifying that businesses pay only for the software they need;
(c) strengthen the position of the business when negotiating software licenses by providing a complete view of software needs across the enterprise; and
(d) guarding against software license compliance problems, and potential embarrassment of not meeting contractual licensing conditions.

To assist in compliance with various contractual requirements related to information technology, other tools are available such as IBM Tivoli Contract Compliance Manager ("TCCM"). TCCM is an IT Contract Management product that helps users to achieve the efficient management of the contractual and financial details of IT agreements. When used with Tivoli License Compliance Manager for z/OS® and Tivoli License Manager for distributed systems, Tivoli Contract Compliance Manager can help users manage software costs and contract compliance. This software asset management solution helps IT personnel to align software spending with business priorities. The information provided can help organizations reduce software costs and compliance risk, and to allocate additional resources to priority projects.

The IT contract and financial information stored in Tivoli Contract Compliance Manager can enable IT personnel to:

(a) manage IT contracts including hardware and software purchase, lease, and maintenance agreements;
(b) prepare for contract negotiation with notifications, scanned contract reviews, and key term and conditions comparisons;
(c) manage the contract preparation, negotiation, and approval workflow process;
(d) track legal document relationships;
(e) forecast expected payments and depreciation schedules;
(f) reconcile invoices;

(g) improve disaster recovery through organized electronic contract storage; and (h) organize and manage non-IT contracts.

When integrated with Tivoli License Compliance Manager for Z/OS and Tivoli License Manager for Distributed Systems, Tivoli Contract Compliance Manager can enable IT personnel to:

(a) avoid software contract compliance violations based on software use;

(b) plan cost effective capacity upgrades or consolidations;

(c) enhance the charge-back process by allocating the expensive of low-use software to the appropriate department.

However, these tools are designed primarily for "in-house" management of IT assets, and are of less assistance when producing software solutions for delivery and deployment out-of-house, such as installing software and applications at a client's site.

To address this need, and according to another aspect of the present invention, the Solution Wizard is provided with an automated process to determine which licenses for which components are needed to be included with the computing solution, preferably to access a license management system and a contract compliance system, to register, check-out, or otherwise obtain permission to issue the necessary group of licenses, and to produce a license package for delivery in association with the executable computing solution.

Figure 22:
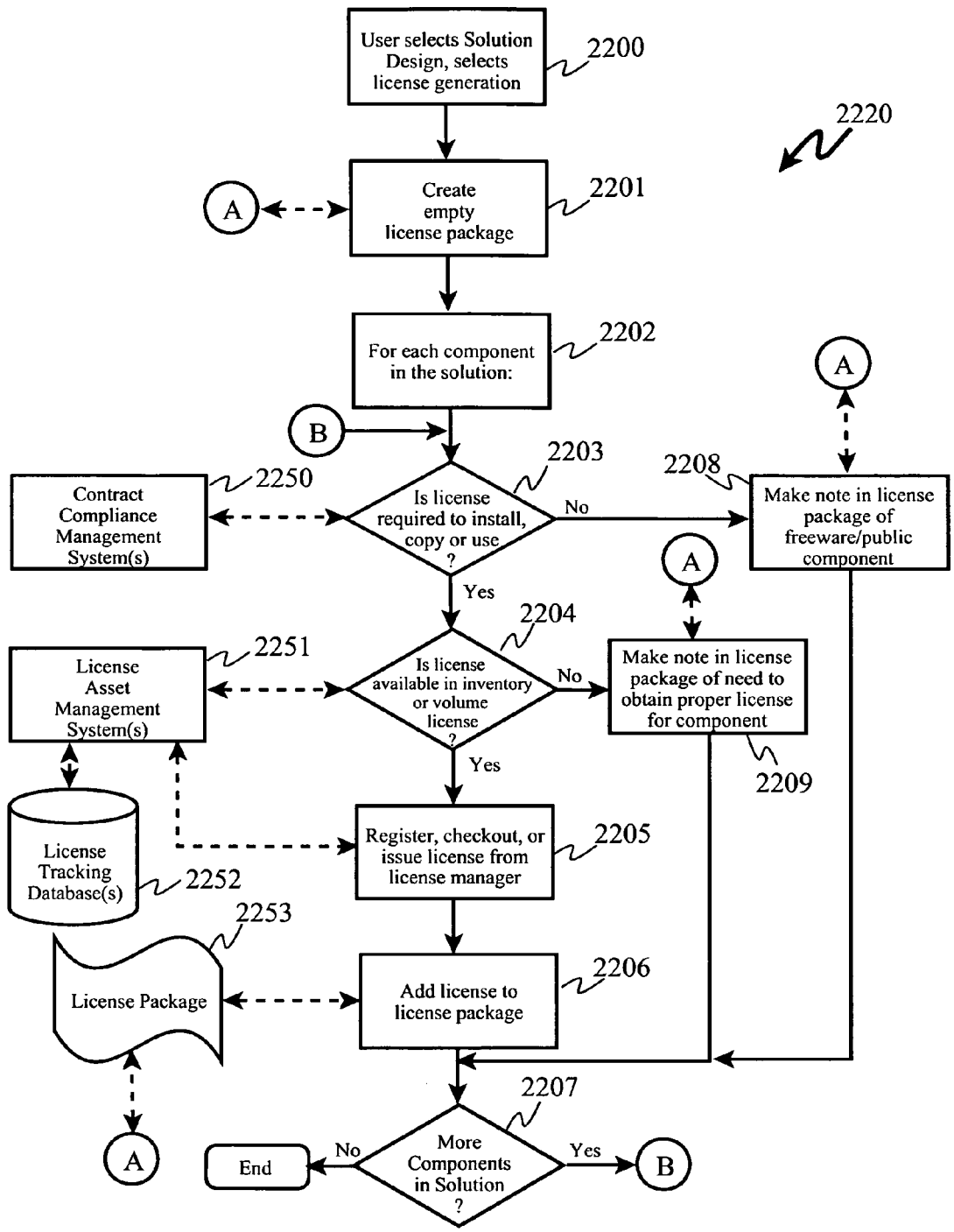
FIG. 22 illustrates the logical process of the Software License Package Generator according to the present invention.

Turning to FIG. 22, details of a logical process according to the invention for the automated License Generation (2220) are shown. After the user has selected a solution design and selected to have a license package generated (2200), a new license package is created (2201), or an existing license package is opened. A license package (2253) can be as simple as a text file including notes regarding the license numbers (e.g. serial numbers, enabling codes, etc.) for each of the components in the solution. Preferably, additional information about the source of the license, the component features, date of issue of the license, etc., are also recorded, such as the license package as shown in Table 1.

TABLE 1

Example License Package

```
<soluntion_wizard_license_package>
<solution_info>
    Solution Name: Western_Bank_Loan_App
    Solution Version: 1.0
    Date of License Generation: 1/1/2005
</solution_info>
<component>
    type: database
    supplier: Oracle
    identifier: version 8.2.2
    license: 4FDW02842X93
    note: from IBM volume group 2004-IRSB
</component>
<component>
    type: WAS
    supplier: IBM
    identifier: version 10.2
    license: IBM-235UREQ972
    note: from IBM stock
</component>
<component>
    type: LINUX
    supplier: open source
    identifier: version 3.2
    license: --
    note: no license required
```

TABLE 1-continued

Example License Package

```
</component>
<component>
    type: Lotus SameTime Messenger
    supplier: Lotus
    identifier: version 6.1
    license: WARNING
    note: LICENSE SHOULD BE OBTAINED BEFORE USE
</component>
    :
    :
</soluntion_wizard_license_package>
```

Next, for each component in the solution (2202), it is determined if a license is required for the component (2203), such as by querying a contract compliance management system (2250), or by prompting a user. Some components may not require specific license, such as "shareware" and "freeware", and if so, then a note is preferably placed in the license package (2253).

Otherwise, availability of a licensed is checked (2204), such as by querying a license asset management system (2251), or by prompting a user. If a license is available, it is issued, checked-out, or otherwise taken from the license inventor (2252), which typically results in issuance of a license number, serial number, unlocking code, or similar. This information is then added (2206) to the license package (2253), and if more components exist in the solution (2207), the process is repeated (2203-2209), until the license package (2253) contains notes or licenses for every component in the solution.

If (2204) a license for a particular component is not available in inventory (2253), then preferably the user is notified, such as by placing (2209) a note in the license package indicating the need to obtain a proper license.

It should be noted that using this portion of the invention, the software license generation process differs from traditional existing methods, because it reduces much of the manual work, while it only generates the applicable EULA that users need. By cooperating with license management and/or contract compliance management tools, the advantages of in-house IT asset management are leveraged into solutions development and delivery processes. Moreover, the user can have the option to preview the license agreements that will be generated for the prototyped solution during development.

It will be appreciated by those skilled in the art, however, that many software license alternatives or methods may be used depending on an user's initial setup with the GUI palette and the invention is not limited to these specific embodiments.

CONCLUSION

Certain embodiments and design choices have been described and illustrated in the foregoing paragraphs in order to disclose the invention and its preferred embodiment. It will be appreciated by those skilled in the art, however, that the scope of the invention is not limited to these specific embodiments, and that many variations and choices regarding, but not limited to, operating system, programming language, programming methodology, and platform, can be made without departing from the spirit and scope of the present invention. Therefore, the scope of the present invention is defined by the following claims.

What is claimed is:

1. A system for generating a license package comprising:
   a computing platform having a hardware means suitable for executing solution building tools and programs;
   a plurality of behavioral model instances for system solution components associated with a system solution under design by a solution building wizard, said model instances being configured by one or more behavioral parameters and one or more interface parameters according to a set of user inputs, said solution building wizard providing a graphical user interface through which a user selects a plurality of predefined templates for solution components to create a cohesive computing solution;
   a license retriever cooperative with said solution builder wizard which determines by accessing at least one data repository that one or more licenses are available for each behavioral model instance selected by the user, and which obtains a license code for each configured behavioral model instance for which a license is available;
   a license information package generator creating or modifying an electronic license information package file, the package file including list of license numbers associated with retrieved license codes and including one or more notes selected from a group consisting of a license serial number, a software package enabling code, a software package unlocking code, a granting source of a license, a component feature description, and an issue date of a license; and
   the created or modified electronic license package file stored in a computer readable storage memory device.

2. The system as set forth in claim 1 wherein said license retriever is further adapted to query a license asset management system to determine if one or more licenses are available for each behavioral model instance.

3. The system as set forth in claim 1 wherein said license retriever is further adapted to query a license asset management system to obtain said license codes.

4. The system as set forth in claim 3 wherein said license codes comprise a code selected from a group consisting of a license number, a serial number, and an unlocking code.

5. The system as set forth in claim 1 wherein said license retriever is further adapted to create a note regarding inclusion of a component for which no license was available, and wherein said license package generator is further adapted to include said note in said storage memory device.

6. The system as set forth in claim 1 wherein said storage memory device comprises an item selected from the group consisting an electronic text file, an encoded electronic file, and encrypted electronic file, and a markup language file.

7. The system as set forth in claim 1 wherein said license retriever is further adapted to query a contract management system regarding requirements to obtain a license for each component, and to generate a note regarding the lack of licensing requirement for a component for which no license is required, and wherein said license package generator is further adapted to include said note in said storage memory device.

8. A computer-performed method for generating license bundles or packages related to a computing system solution having a plurality of computing components, the method comprising the steps of:
   providing a computing platform suitable for executing solution building tools and programs;
   executing by said computing platform a solution building wizard having a plurality of behavioral model instances for system solution components associated with a system solution design, said model instances being configured by one or more behavioral parameters and one or more interface parameters according to a set of user inputs;
   cooperative to operation of said solution building wizard, determining by accessing at least one data repository if one or more licenses are available for each behavioral model instance;
   obtaining a license code for each configured behavioral model instance for which a license is available;
   creating or modifying an electronic license information package file to include a list of license numbers associated with retrieved license codes and including one or more notes selected from a group consisting of a license serial number a software package enabling code, a software package unlocking code, a granting source of a license, a component feature description, and an issue date of a license; and
   storing the created or modified electronic license information package file in a storage memory device.

9. The method as set forth in claim 8 wherein said step of determining if one or more licenses are available for each behavioral model instance comprises querying a license asset management system.

10. The method as set forth in claim 8 wherein said step of obtaining license codes comprises querying a license asset management system.

11. The method as set forth in claim 10 wherein said query of a license asset management system further comprises receiving a license code selected from the group of a license number, a serial number, and an unlocking code.

12. The method as set forth in claim 8 further comprising creating a note regarding inclusion of a component for which no license was available, and including said note in said storage memory device.

13. The method as set forth in claim 8 wherein said step of generating a license package comprises creating of modifying an item selected from the group of an electronic text file, an encoded electronic file, and encrypted electronic file, and a markup language file.

14. The method as set forth in claim 8 further comprising the steps of: querying a contract management system regarding requirements to obtain a license for each component; generating a note regarding the lack of licensing requirement for a component for which no license is required; and including said note in said electronic medium.

15. A computer readable storage medium encoded with software for generating license bundles or packages related to a computing system solution having a plurality of computing components, the storage medium comprising:
   a computer readable storage medium suitable for encoding software programs; and
   one or more software programs encoded by the computer readable storage medium configured to cause a computing platform to perform the steps of:
      providing a solution building wizard tool to a user, said wizard tool having a plurality of behavioral model instances for system solution components associated with a system solution design, said model instances being configured by one or more behavioral parameters and one or more interface parameters according to a set of user inputs;
      cooperative to operation of said solution building wizard, determining by accessing at least one data repository if one or more licenses are available for each behavioral model instance;

obtaining a license code for each configured behavioral model instance for which a license is available;

creating or modifying an electronic license information package file to include a list of license numbers associated with retrieved license codes and including one or more notes selected from a group consisting of a license serial number a software package enabling code, a software package unlocking code, a granting source of a license, a component feature description, and an issue date of a license; and storing the created or modified electronic license information package file in a storage memory device.

16. The computer readable storage medium as set forth in claim 15 wherein said step of determining if one or more licenses are available for each behavioral model instance comprises querying a license asset management system.

17. The computer readable storage medium as set forth in claim 15 wherein said step of obtaining license codes comprises querying a license asset management system.

18. The computer readable storage medium as set forth in claim 17 wherein said query of a license asset management system further comprises receiving a license code selected from the group of a license number, a serial number, and an unlocking code.

19. The computer readable storage medium as set forth in claim 15 further comprising software for creating a note regarding inclusion of a component for which no license was available, and including said note in said storage memory device.

20. The computer readable storage medium as set forth in claim 15 wherein said step of generating a license package comprises creating of modifying an item selected from the group of an electronic text file, an encoded electronic file, and encrypted electronic file, and a markup language file.

21. The computer readable storage medium as set forth in claim 15 further comprising software for: querying a contract management system regarding requirements to obtain a license for each component;

generating a note regarding the lack of licensing requirement for a component for which no license is required;

and including said note in the storage memory device.

* * * * *